United States Patent
Demonceau et al.

(10) Patent No.: US 6,389,310 B1
(45) Date of Patent: May 14, 2002

(54) METHOD AND APPARATUS FOR ANALYZING HEART FUNCTION USING 4D ECG SYNCHRONIZED HEART CAVITY TOMOSCINTIGRAPHY

(76) Inventors: Georges Demonceau, Rodestraat 91, B-9620 Zottegem; Michel Bister, Avenue de la Gazelle 52/54, B-1180 Brussels; Chris Van Hove, Winkelstraat 5, B-9032 Gent-Wondelgem, all of (BE)

(*) Notice: Subject to any disclaimer, the term of this patent is extended or adjusted under 35 U.S.C. 154(b) by 0 days.

(21) Appl. No.: 09/517,595

(22) Filed: Mar. 2, 2000

Related U.S. Application Data

(60) Provisional application No. 60/122,378, filed on Mar. 2, 1999.

(51) Int. Cl.$^7$ ............................................. A61B 5/0402
(52) U.S. Cl. ........................................ 600/512; 600/509
(58) Field of Search .................................. 600/512, 508

(56) References Cited

U.S. PATENT DOCUMENTS 6,289,135 B1 * 9/2001 Declerck et al. ............ 382/276

OTHER PUBLICATIONS

1990/1991, "Ischemic heart disease and regional left ventricular wall motion: a study comparing radial, centerline and a video intensity based slope technique" Sunnerhagen, et al. *International Journal of Cardiac Imaging*, vol. 6, pp. 85–96.

Feb. 1990, "Effect of myocardial wall thickness on Spect quantification", Galt, et al. IEEE Transactions on Medical imaging, vol. 9, No. 2, pp. 144–150.

Apr. 1989, "An efficient uniform cost alogorithm applied to distance transforms" Verwer, et al. IEEE Transactions on Pattern Analysis and Machine Intelligence, vol. 13, No. 6, Jun. 1991.

"Watersheds in Digital spaces: an effieicnt alogorithm based on immersion simulations" Vincent, et al. IEEE Transactions on Pattern Analysis and Machine Intelligence, vol. 13, No. 6, Jun. 1991.

"Towards automated analysis in 3D cardiac MR imaging" Bister, et al. Lecture notes in Computer Science, Springer–Verlag 1991, IMPI 91, 12$^{th}$ International Conferenceon Information Medical Imaging, Wye, UK pp. 205–217.

"Digital Image Processing", Gonzales, et al. Addison–Wesley Publishing Company, 1992, pp. 81–92 and 119–128.

1982, "Digital Picture Processing" Rosenfeld, et al. Academic Press, pp. 42–46.

* cited by examiner

*Primary Examiner*—Carl Layno
(74) *Attorney, Agent, or Firm*—Altera Law Group

(57) ABSTRACT

A computer program storage medium readable by a computing system and encoding a computer program of instructions for executing a computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity.

168 Claims, 10 Drawing Sheets

Fig.1 : TRANSVERSAL SECTION

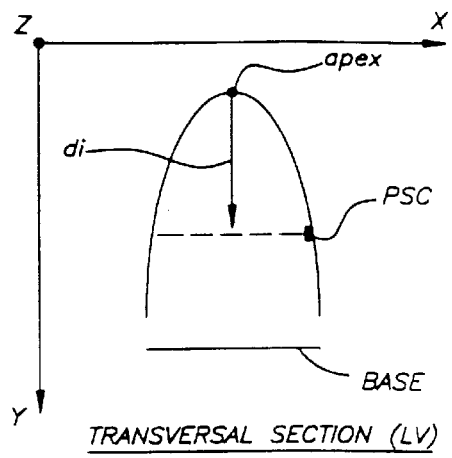
TRANSVERSAL SECTION (LV)
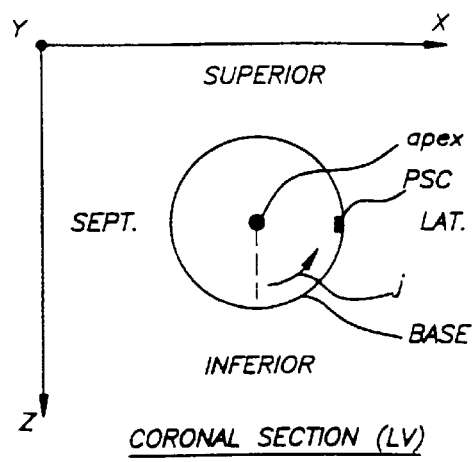
CORONAL SECTION (LV)
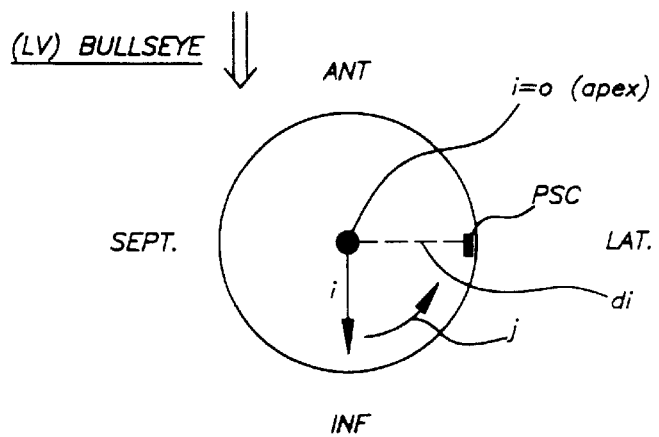
Fig.4

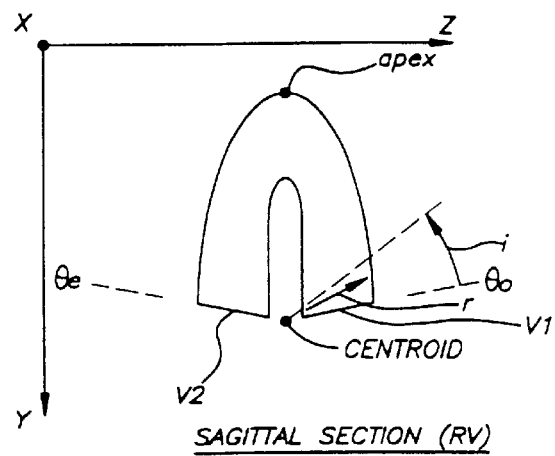
SAGITTAL SECTION (RV)
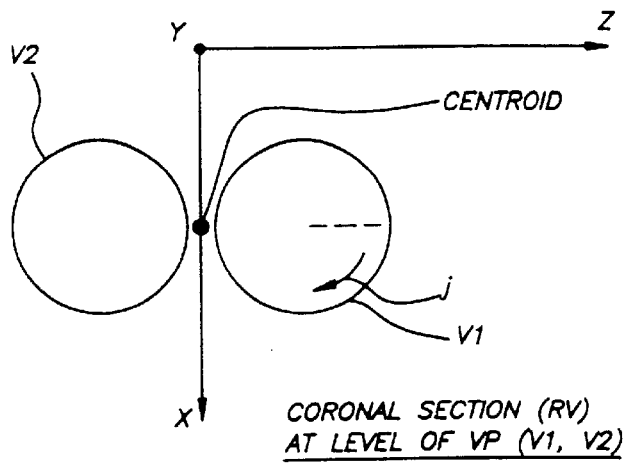
CORONAL SECTION (RV)
AT LEVEL OF VP (V1, V2)
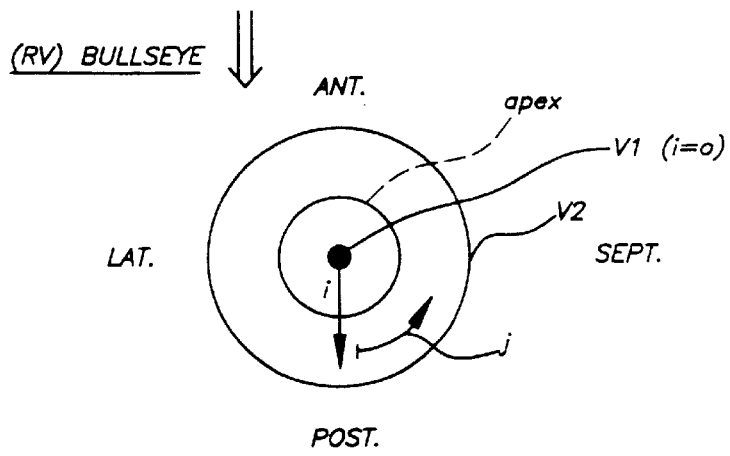
Fig.5

METHOD AND APPARATUS FOR ANALYZING HEART FUNCTION USING 4D ECG SYNCHRONIZED HEART CAVITY TOMOSCINTIGRAPHY

This application claims benefit of Provisional 60/122,378 filed Mar. 2,1999.

FIELD OF THE INVENTION

The present invention relates to a computer program storage medium suitable for treating data obtained from an synchronized electrocardiogram tomoscintigraphy, as well as a method and an apparatus for executing in a computing system the treatment of said data.

STATE OF THE ART

Reference is made to various publications for disclosing specific analysis or techniques used in the program and method of the invention.

These publications are:

"Ischemic heart disease and regional left ventricular wall motion: a study comparing radial, centerline and a video intensity based slope technique", International Journal of Cardiac Imaging 6:85–96, 1990/91, Sunnerhagen et al;

"effect of myocardial wall thickness on Spect quantification", IEEE Transactions on Medicakl imaging, vol 9, No 2, June 1990, pages 144 to 150, James Galt ety al;

"an efficient uniform cost algorithm applied to distance transforms", Verwer et al, IEEE transactions on pattern analysis and machine intelligence, vol 11, No 4, April 1989, description of distance transform;

"Watersheds in Digital spaces: an efficient algorithm based on immersion simulations", Vincent et al, IEEE transactions on pattern analysis and machine intelligence, vol 13, No 6, June 1991, (description of the watershed);

"Towards automated analysis in 3D cardiac MR imaging", Bister et al, lecture notes in Computer Science, Springer-Verlag 1991, IMPI 91, 12th International Conference on Information Medical imaging, Wye, UK, pp 205–217 (description of the PDM and the egmentation);

"Digital Image Processing", Gonzales et al, Addison-Wesley Publishing Company, 1992, page 81 to 92 and pages 119 to 128, (the FFT method);

"Digital Picture Processing", Rosenfeld et al, Academic Press, 1982, pages 42–46 (the matched filter);

"use of watersheds in contour detection", Beucher et al, International Workshop on Image processing, real time edge and motion detection/estimation, Rennes, France, September 1979;

"Distance transformations in digital images", Borgefors, Journal CVGIP(34), No 3, June 1986, pages 244–371 (description of distance transform).

The content of these publications is incorporated in the present specification by reference for the disclosure of specific methods, algorithms, etc.

The majority of the cardiac pathologies cause an abnormal function or working of one or more cavities of the heart, and/or an abnormal volume for these cavities. For example, a lack of heart perfusion could lead to ischemia and/or infarct: these muscular fiber lesions don't allow a correct contraction of a portion of the heart. Also, pericardium problems, (for example a hardening or thickening of the heart envelope) will cause an abnormal expansion of one or more cavities. An abnormal working of the heart valves will modify the normal transit of the blood into the cavities, reducing the blood output. So, severe abnormal working or volume of one or more cavities of the heart will cause major problem in the blood flow and thus in the vascularisation of the body. These pathologies can also be associated with severe troubles in the cardiac rhythm, conducting to sudden deaths by stop or anarchic contraction of the cardiac walls.

Therefore, there is a need for having a correct analysis or view of one or more cavities of the heart.

Cardiac scintigraphy synchronized with ECG is a known technique for studying the heart. Before the acquisition really starts, the mean duration of a cardiac cycle is calculated and time interval are defined (the "time bins"). By said technique, it is possible to visualize, by means of gamma rays, the distribution and the concentration of a radioisotope present in the heart during the cardiac cycle. There are roughly two approaches: the analysis of the myocardium and the analysis of the cavities themselves. There are also 2 major techniques: the planar and the tomographic scintigraphies:

a) the analysis of the myocardium: using an perfusion myocardial tracer (a product staying in the myocardial cell proportionally to the local flow and labeled with an radioactive agent) allows a good visualization of lack of vascularisation into the walls of mainly the left ventricle (LV). The topography technique allows a visualization in 3 dimensions (3D) of the heart, which is not possible with the planar (1 or 2 incidences) technique. This analysis has the drawback that the variation of maximal activity in the wall, which is correlated to the thickening of said wall, is influenced by a partial volume effect (Galt, 1990), and therefore based on a data which is not only correlated to the number of registered photons, but also to due to a lack of resolution. Moreover, the maximum variation is also correlated to the attenuation of the rays between the emitting heart portion and the detecting means, said attenuation of the rays being variable from patient to patient and, for the same patient, from place to place inside the thorax.

Furthermore, this analysis does not give a correct and precise view of the basal portion of the left ventricle, nor in the right ventricle and in the pathologies relating to local perfusion. Therefore, the analysis given many uncertainties about the exact shape and volume of said ventricles. Walls of the auricles or portion thereof arc also not visible.

Furthermore, the known myocardial scintigraphy technology is not adapted for correcting the image due to the movement of the heart. These movements could be due to motion of the heart in the thorax and/or due to the movement of the thorax (caused for example by the breath) and/or due to a movement of the patient during his examination. There is no place defined by the said technology in the heart, which can be used as a reference: a correction of the general cardiac motion is not possible.

b) the analysis of the cavities themselves: it has been proposed to study directly the heart cavities by labeling the red blood cells by means of a radioactive element, such as a gamma emitter or a positron emitter. This method gives only a substantially correct view of the inner wall of the heart, but give a goof imaging of all the cavities of the heart. The major problem of the planar imaging technology is that there is an overlapping, in the different views, of the cavities, whereby the limits and, a fortiori, the wall motions and the volume of one cavity are difficult to appreciate and to quantify.

In the known apparatus the data are treated so as to give a 2-dimension or 3-dimensions (time +2 spatial dimensions)

analysis. In the treatment of the data, the cardiac activity is not really corrected in function of the position of the heart or a portion thereof: the proposed 2D correction use the centroid of the (ventricular) cavity as the reference point for the evaluation of the segmental wall motion, but this centroid can be falsely displaced during the cycle if the wall contraction is not synchronous and/or symmetrical (which is even physiologically generally not the case).

It has finally also been proposed to make a tomographic analysis of the heart, said analysis studying the different volumes in function of the time. Said analysis gives many data's to the operator or user, said data's being as such quite complicated to be analyzed. The analysis gives a series of images, each image being defined by a matrix, classically of 64×64×64 pixels and 8 time bins, each time bin corresponding to a part of the heart cycle.

The present invention aims, in a tomographic analysis of the cardiac chambers synchronized with ECG, to normalize the cardiac time bin activity, to correct for the global motion of the heart inside the considered matrix, to label the different cardiac cavities, to extract from these data the meaningful parameters and to display them in a 2D way appropriated, when necessary, to compare with normal data bases, so as to enable in preferred embodiments, at least a automated preprocessing of a four or five -dimensional analysis of one or more chambers of the heart, which could be afterwards easily controlled and corrected by the user.

BRIEF DESCRIPTION OF THE INVENTION

In this document, the word <<pixel>> is used irrespective of the number of dimensions involved (2D,3D,4D,5D, . . . ) The present invention relates to a computer program storage medium readable by a computing system which is useful for the analysis of the function of at least one cavity of the heart, especially for the analysis of the function of the fourth cavities of the heart, namely the left auricle, the left ventricle, the right auricle and the right ventricle.

According to a specific embodiment, the computer program can receive one or more inputs from the user for correcting the image received from the tomoscintigraphy apparatus, said image being obtained by the detection of positrons or photons.

A correct tomography analysis allows a visualization of one or more cavities of the heart, preferably of all the cavities of the heart, without superposition of the views.

A first object of the invention is a computer program storage medium readable by a computing system and encoding a computer program of instructions for executing a computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomoscintigraphy corresponding to 3dimensional images at different time bins, said images being defined by pixels;

normalizing the activity at each time bin;

determining a rigid model comprising a reference;

determining, for each time bin, the correction movement for matching the reference and correcting fot this in each time bin;

determining the time bins for end-systole and end-diastole;

determining the phase and amplitude of pixels of the 3dimensional images;

filtering temporally and spatially substracting the background segmenting the images;

temporal and spatial filtering;

labeling the ventricles and the auricles computing at least a parameter selected from the group consisting of activity curves, thickness of at least a portion of the septum, ventricular movements;

determining of 2D representations ofsegmenrtal motion, and a displaying results.

Advantageously, the data read are 3dimentional images at different time bins for at least two different physical states (for example at different efforts, before and after absorption of a drug, etc.).

A second object of the invention is a computer program storage medium readable by a computing system and encoding a computer program of instructions for executing a computer process for the treatment of data obtained from synchronized electrocardiogram tomography, especially electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomographic imaging corresponding to 3dimensional images at different time bins, said images being defined by pixels;

determining from data obtained from the synchronized electrocardiogram tomographic imaging a reference position of a first portion of the heart selected from the group consisting of the valvular plane, at least a portion of the septum and the valvular plane with at least a portion of the septum;

determining from said data obtained from the synchronized electrocardiogram tomographic imaging a position of the the first portion of the heart at each time bin;

for each time bin, determining a movement for matching the first portion at the considered time bin with the reference position of the first portion;

using the determined movement for correcting the 3dimensional images at the different time bins, and using the corrected 3dimensional images for determining an accurate localisation an of the heart.

Said second object of the invention is advantageously implemented in the first object of the invention, but can be implemented in any other existing treatment of data obtained from synchronized electrocardiogram tomoscintigraphy or from electrocardiogram tomographic imaging.

In said second object, the computer process comprises advantageously the steps of:

determining from data obtained from the synchronized electrocardiogram tomographic imaging a reference position of the valvular plane;

determining from said data obtained from the synchronized electrocardiogram tomographic imaging a position of the valvular plane at each time bin, and for each time bin, determining a movement for matching the valvular plane at the considered time bin with the reference position of the valvular plane.

In an embodiment of said second object, the computer process comprises advantageously the steps of:

determining from data obtained from the synchronized electrocardiogram tomographic imaging a reference position of the valvular plane and at least a portion of the septum;

determining from said data obtained from the synchronized electrocardiogram tomographic imaging a position of the valvular plane and at least a portion of the septum at each time bin, and for each time bin, determining a movement for matching the valvular plane and at least a portion of the septum at the considered time bin with the reference position of the valvular plane and septum.

In another embodiment of said second object, the computer process comprises advantageously the steps of:

determining from data obtained from the synchronized electrocardiogram tomographic imaging a reference position of at least a portion of the septum;

determining from said data obtained from the synchronized electrocardiogram tomographic imaging a position of at least a portion of the septum at each time bin, and for each time bin, determining a movement for matching at least a portion of the septum at the considered time bin with the reference position of at least a portion of the septum.

A third object of the invention is a computer program storage medium readable by a computing system and encoding a computer program of instructions for executing a computer process for the treatment of data obtained from synchronized electrocardiogram tomographic imaging, especially electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomographic imaging corresponding to 3dimensional images at different time bins, said images being defined by pixels;

determining from data obtained from the synchronized electrocardiogram tomographic imaging a position of a portion of the heart selected from the group consisting of the valvular plane, at least a portion of the septum and the valvular plane with at least a portion of the septum;

labeling in the image from said position at least a region of interest selected from the group consisting of left ventricle, right ventricle, left auricle, right auricle, ventricles, auricles, left auricle and left ventricle, right auricle and right ventricle.

Said third object of the invention, with possibly its details or characteristics of possible embodiments thereof, is advantageously implemented in the first and/or second object of the invention, but can be implemented in any other existing treatment of data obtained from synchronized electrocardiogram tomoscintigraphy or from electrocardiogram tomographic imaging.

According to an embodiment of the third object of the invention, said computer process comprises at least the steps of:

reading data obtained from the synchronized electrocardiogram tomographic imaging corresponding to 3dimensional images at different time bins, said images being defined by pixels;

determining from data obtained from the synchronized electrocardiogram tomographic imaging, at each time bin, a position of a portion of the heart selected from the group consisting of the valvular plane, at least a portion of the septum and the valvular plane with at least a portion of the septum;

labeling in the image at each time bin, from said position at least a region of interest selected from the group consisting of left ventricle, right ventricle, left auricle, right auricle, ventricles, auricles, left auricle and left ventricle, right auricle and right ventricle.

According to another embodiment of the third object of the invention, said computer process comprises at least the steps of:

determining from data obtained from the synchronized electrocardiogram tomographic imaging, a position of the valvular plane with at least a portion of the septum;

labeling in the image, at least a region of interest selected from the group consisting of left ventricle, right ventricle, left auricle, right auricle.

According to a detail of the third object of the invention, said computer process comprises at least the steps of:

determining from data obtained from the synchronized electrocardiogram tomographic imaging a position of the valvular plane with at least a portion of the septum;

labeling in the image, from said position, at least two regions of interest selected from the group consisting of left ventricle, right ventricle, left auricle, right auricle.

According to another detail of the third object of the invention, said computer process comprises at least the steps of:

determining from data obtained from the synchronized electrocardiogram tomographic imaging a reference position of a first portion of the heart selected from the group consisting of the valvular plane, at least a portion of the septum and the valvular plane with at least a portion of the septum;

determining from said data obtained from the synchronized electrocardiogram tomographic imaging a position of the the first portion of the heart at each time bin;

for each time bin, determining a movement for matching the first portion at the considered time bin with the reference position of the first portion;

using the determined movement for correcting the 3dimensional images at the different time bins, and using the corrected 3dimensional images for determining an accurate localisation of the heart.

According to still another embodiment of the third object of the invention, said computer process comprises at least the steps of:

determining from data obtained from the synchronized electrocardiogram tomographic imaging a reference position of the valvular plane determining from said data obtained from the synchronized electrocardiogram tomographic imaging a position of the valvular plane at each time bin, and for each time bin, determining a movement for matching the valvular plane at the considered time bin with the reference position of the valvular plane.

According to a possible characteristic of the third object of the invention, said computer process comprises at least the steps of:

determining from data obtained from the synchronized electrocardiogram tomographic imaging a reference position of the valvular plane and at least a portion of the septum;

determining from said data obtained from the synchronized electrocardiogram tomographic imaging a position of the valvular plane and at least a portion of the septum at each time bin, and for each time bin, determining a movement for matching the valvular plane and at least a portion of the septum at the considered time bin with the reference position of the valvular plane and septum.

According to still another possible characteristic of the third object of the invention, said computer process comprises at least the steps of:

determining from data obtained from the synchronized electrocardiogram tomoscintigraphy a reference position of the septum;

determining from said data obtained from the synchronized electrocardiogram tomoscintigraphy a position of the septum at each time bin, and for each time bin, determining a movement for matching the septum at the considered time bin with the reference position of the septum.

A fourth object of the invention is a computer program storage medium readable by a computing system and encoding a computer program of instructions for executing a computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomoscintigraphy corresponding to 3dimensional images at different time bins, said images being defined by pixels;

determining and labeling from data obtained from the synchronized electrocardiogram tomoscintigraphy at least a segment corresponding to at least a part of an organ selected from the group consisting of aorta descendens, spleen, liver, valvular plane, the septum, ventricle, auricle.

Said fourth object of the invention, with possibly its details or characteristics of possible embodiments thereof, is advantageously implemented in the first and/or second and/or third object of the invention, but can be implemented in any other existing treatment of data obtained from synchronized electrocardiogram tomoscintigraphy.

In said fourth object, the computer process comprises advantageously the steps of:

labeling in the image a region corresponding to the Aorta descendens;

labeling in the image a region corresponding to the spleen;

labelling in the image a region corresponding to the valvular plane and a region correponding to the septum;

from said labeled regions of the valvular plane and septum, determining and labeling in the image regions corresponding to the ventricles and the auricles.

A fifth object of the invention is a computer program storage medium readable by a computing system and encoding a computer program of instructions for executing a computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomoscintigraphy corresponding to 3dimensional images at different time bins, said images being defined by pixels;

determining pixels defining at least a part of a wall of a region of interest of the heart;

determining for said part an average activity at each time bin, determining for said part for at least a part of the heart cycle, an average slope of activity in function of time bins;

determining for each pixel of the part considered and for the portion of heart cycle considered, an actual slope of activity in function of time bins, and determining a status parameter of pixels defining the part considered, by comparison for the pixel considered, the actual slope of activity with the average slope.

Said fifth object of the invention, with possibly its details or characteristics of possible embodiments thereof, is advantageously implemented in the first and/or second and/or third and/or fourth object of the invention, but can be implemented in any other existing treatment of data obtained from synchronized electrocardiogram tomoscintigraphy.

A sixth object of the invention is a computer program storage medium readable by a computing system and encoding a computer program of instructions for executing a computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomoscintigraphy corresponding to 3dimensional images at different time bins, said images being defined by pixels;

determining pixels defining at least a part of a wall of a region of interest of the heart;

determining for said part an average activity at each time bin, determining for said part for at least a part of the heart cycle, an average slope of activity in function of time bins;

determining a correlation, time bin per time bin, for the pixels of the part considered, between the actual activity and the average activity of the part considered, and determining, from the correlation, a status parameter of pixels defining the part considered.

Advantageously, the computer process determines a correlation, during the heart cycle, for the pixels of the part considered, between the actual activity and the average activity of the part considered.

Said sixth object of the invention, with possibly its details or characteristics of possible embodiments thereof, is advantageously implemented in the first and/or second and/or third and/or fourth and/or fifth object of the invention, but can be implemented in any other existing treatment of data obtained from synchronized electrocardiogram tomoscintigraphy.

A seventh object of the invention is a computer program storage medium readable by a computing system and encoding a computer program of instructions for executing a computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomoscintigraphy corresponding to 3dimensional images at different time bins, said images being defined by pixels;

determining pixels defining at least a part of the peel of the right ventricles, said ventricle having the general shape of a tube with a point of cuvature extending between two valves;

determining a 3dimensional parameter for the pixels considered;

using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered.

Said seventh object of the invention, with possibly its details or characteristics of possible embodiments thereof, is advantageously implemented in the first and/or second and/or third and/or fourth and/or fifth and/or sixth object of the invention, but can be implemented in any other existing treatment of data obtained from synchronized electrocardiogram tomoscintigraphy.

In the seventh object of the invention, the transform defines advantageously each pixel by parameters characterizing the position of the pixel considered in a plane passing through said pixel and through a base defined between the first and second valves.

Preferably, the position of each pixel of the peel of the right ventricle is defined by the parameters i and j, said parameter being determined by the following formulas:

$\theta = \arctan((y_{base}-y)/(z-z_{cog}))$ $i = NSA*(\theta-\theta_0)/(\theta_e-\theta_0)$ $r = sqrt((y_{base}-y)^2+(z-z_{cog})^2)$ $j = (NPSA/2\pi)*\arctan((x-x_{cog,i})/(r-r_{cog,i}))$ whereby x,y,z are the position of the pixel considered along three perpendicular axis;

$y_{base}$ is the y position of the base;

$\theta_0, \theta_e$ are the start- and stop angle over which i rotates (for example 18° and 150°);

$z_{cog}$ is the global center of gravity of the RV;

$x_{cog,i}$, $r_{cog,i}$ are respectively the x and r positions of the center of gravity of the RV in the i-plane;

NSA is the number of concentric circles in the bullseye;

NPSA is the number of sectors in the bullseye.

A eight object of the invention is a computer program storage medium readable by a computing system and encoding a computer program of instructions for executing a computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomoscintigraphy corresponding to 3dimensional images at different time bins, said images being defined by pixels;

determining pixels defining at least a part of a wall of the right ventricle, said ventricle having the general shape of a tube with a point of cuvature extending between two valves;

determining for said part an average activity at each time bin, determining for said part for at least a part of the heart cycle, an average slope of activity in function of time bins;

determining for each pixel of the part considered and for the portion of heart cycle considered, an actual slope of activity in function of time bins, and determining a status parameter of pixels defining the part considered, by comparison for the pixel considered, the actual slope of activity with the average slope;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

Advantageously, the transform defines each pixel by parameters characterizing the position of the pixel considered in a plane passing through said pixel and through a base defined between the first and second valves.

Preferably, the position of each pixel of the peel of the right ventricle is defined by the parameters i and j, said parameter being determined by the following formulas:

$\theta = \text{arc tangent}((y_{base}-y)/(z-z_{cog}))$ $i = NSA^*(\theta-\theta_0)/(\theta_e-\theta_0)$ $r = sqrt((y_{base}-y)^2+(z-z_{cog})^2)$ $j = (NPSA/2\pi)^* \text{arc tangent} ((x-x_{cog,i})/(r-r_{cog,i}))$ whereby x,y,z are the position of the pixel considered along three perpendicular axis;

$y_{base}$ is the y position of the base;

$\theta_0$, $\theta_e$ are the start- and stop angle over which i rotates (for example 18° and 150°);

$z_{cog}$ is the global center of gravity of the RV;

$x_{cog,i}$, $r_{cog,i}$ are respectively the x and r positions of the center of gravity of the RV in the i-plane;

NSA is the number of concentric circles in the bullseye;

NPSA is the number of sectors in the bullseye.

Said eigth object of the invention, with possibly its details or characteristics of possible embodiments thereof, is advantageously implemented in the first and/or second and/or third and/or fourth and/or fifth and/or sixth and/or seventh object of the invention, but can be implemented in any other existing treatment of data obtained from synchronized electrocardiogram tomoscintigraphy.

A ninth object of the invention is a computer program storage medium readable by a computing system and encoding a computer program of instructions for executing a computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomoscintigraphy corresponding to 3dimensional images at different time bins, said images being defined by pixels;

determining pixels defining at least a part of a wall of a region of interest of the heart;

determining for said part an average activity at each time bin, determining for said part for at least a part of the heart cycle, an average slope of activity in function of time bins;

determining a correlation, time bin per time bin, for the pixels of the part considered, between the actual activity and the average activity of the part considered, and determining, from the correlation, a status parameter of pixels defining the part considered, by comparison for the pixel considered, the actual slope of activity with the average slope;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

Advantageously, the transform defines each pixel by parameters characterizing the position of the pixel considered in a plane passing through said pixel and through a base defined between the first and second valves.

Preferably, the position of each pixel of the peel of the right ventricle is defined by the parameters i and j, said parameter being determined by the following formulas:

$\theta = \text{arc tangent}((y_{base}-y)/(z-z_{cog}))$ $i = NSA^*(\theta-\theta_0)/(\theta_e-\theta_0)$ $r = sqrt((y_{base}-y)^2+(z-z_{cog})^2)$ $j = (NPSA/2\pi)^* \text{arc tangent} ((x-x_{cog,i})/(r-r_{cog,i}))$ whereby x,y,z are the position of the pixel considered along three perpendicular axis;

$y_{base}$ is the y position of the base;

$\theta_0$, $\theta_e$ are the start- and stop angle over which i rotates (for example 18° and 150°);

$z_{cog}$ is the global center of gravity of the RV;

$x_{cog,i}$, $r_{cog,i}$ are respectively the x and r positions of the center of gravity of the RV in the i-plane;

NSA is the number of concentric circles in the bullseye;

NPSA is the number of sectors in the bullseye.

Most preferably, the computer process determines a correlation, during the heart cycle, for the pixels of the part considered, between the actual activity and the average activity of the part considered.

Said ninth object of the invention, with possibly its details or characteristics of possible embodiments thereof, is advantageously implemented in the first and/or second and/or third and/or fourth and/or fifth and/or sixth and/or seventh and/or eigth object of the invention, but can be implemented in any other existing treatment of data obtained from synchronized electrocardiogram tomoscintigraphy.

A tenth object of the invention is a computer program storage medium readable by a computing system and encoding a computer program of instructions for executing a computer process for the treatment of data obtained from synchronized electrocardiogram tomographic imaging, especially electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomoscintigraphy corresponding to 3dimensional images at different time bins, said images being defined by pixels;

using a matched filter for determining a parameter of pixels in function of a non spatial dimension.

Advantageously, the computer process comprises the steps of:

determining pixels defining at least a part of a wall of a region of interest of the heart;

determining for said part, by using a matched filter, an average activity at each time bin, determining for said part for at least a part of the heart cycle, by using a matched filter, an average slope of activity in function of time bins;

determining for each pixel of the part considered and for the portion of heart cycle considered, an actual slope of activity in function of time bins, and determining a status parameter of pixels defining the part considered, by comparison for the pixel considered, the actual slope of activity with the average slope.

According to a possible embodiment, the computer process comprises the step of:

determining for said part an average activity at each time bin, by using a matched filter, determining, by using a matched filter, for said part for at least a part of the heart cycle, an average slope of activity in function of time bins;

determining a correlation, time bin per time bin, for the pixels of the part considered, between the actual activity and the average activity of the part considered, and determining, from the correlation, a status parameter of pixels defining the part considered.

Preferably in said embodiment, the computer process further comprises the steps of:

determining pixels defining at least a part of a wall of the right ventricle;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

According to another possible embodiment of the tenth object of the invention, the computer process further comprises the steps of:

a determining pixels defining at least a part of a wall of the right ventricle;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

Said tenth object of the invention, with possibly its details or characteristics of possible embodiments thereof, is advantageously implemented in the first and/or second and/or third and/or fourth and/or fifth and/or sixth and/or seventh and/or eigth and/or ninth object of the invention, but can be implemented in any other existing treatment of data obtained from synchronized electrocardiogram tomoscintigraphy or from electrocardiogram tomographic imaging. A 11th object of the invention is a computer program storage medium readable by computing system and encoding a computer program of instructions for executing computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data from the electrocardiogram tomoscintigraphy giving images of the activity pixel at each time bin;

determining from said images a variation parameter for pixels over the time;

determining at least from said variation parameter at least two segments selected from the group consisting of the ventricular segments and the auricular segments;

determining from said at least two segments, a segment selected from the group consisting of the valvular plane and the septum.

Advantageously, the computer process comprises the step of:

determining the ventricular segments and the auricular segments, and determining the valvular plane between said segments.

Preferably, a segmentation of pixels is operated in function of the determined parameter variation so as to define various segments, in which the segments are merged upto a limited number of segments, while a labeling of the segments is operated as being a label selected from the group consisting of ventricular, auricular, right and left.

According to a possible embodiment, the ventricle segments and the auricle segments are labeled by at least two different methods, and in which the computer process comprises a voting instruction for labeling the segments as being ventricle or auricle.

According top another possible embodiment, the computer process further comprises the steps of:

determining for pixels corresponding to ventricles and auricles, the maximum activity over time;

segmenting the pixels in function of their maximum activity, so as to define segments separated by valley, merging segments with a low valley therebetween up to obtain less than 8 merged segments;

determining at least from said merged segments a ventricle segment and an auricle segment, and labeling the region between the left and right sides as the valvular plane.

According to particularities of embodiments, the computer process labels the left side and right side segments by at least two different methods, and in which the computer process comprises a voting instruction for labeling the segments as being left or right, or the computer process further comprises the steps of:

determining for pixels corresponding to the left and right side segments, the maximum activity over time;

segmenting the pixels in function of their maximum activity, so as to define segments separated by valley, merging segments with a low valley therebetween up to obtain less than 8 merged segments;

determining at least from said merged segments a left side and a right side of the heart, and labeling the region between the left and right sides as the septum.

According to a further embodiment, the computer process further comprises the steps of:

determining for pixels corresponding to ventricles and auricles, the maximum variation of activity over time;

segmenting the pixels in function of their maximum variation of activity, so as to define segments separated by valley, merging segments with a low valley therebetween up to obtain less than 8 merged segments;

determining at least from said merged segments a ventricle segment and an auricle segment, and labeling the region between the left and right sides as the valvular plane.

Said 11th object of the invention, with possibly its details or characteristics of possible embodiments thereof, is advantageously implemented in the first and/or second and/or third and/or fourth and/or fifth and/or sixth and/or seventh and/or eigth and/or ninth and/or tenth object of the invention, but can be implemented in any other existing treatment of data obtained from synchronized electrocardiogram tomoscintigraphy.

According to possible embodiments of the $1^{st}$ to $11^{th}$ inventions, the ROI (region of interest) considered is manually labelled and/or segmented.

The invention relates also to methods corresponding to the processing steps of one of the computer programs of a storage medium of the invention, as well as to an apparatus comprising means for executing the computer program and/or the method according to one of the object of the invention.

Said apparatus is an apparatus for executing in a computing system the treatment of data obtained from synchronized electrocardiogram tomoscintigraphy or from a electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said apparatus comprising at least means for executing the computer process according to any one of the inventions, and more particularly one or more of the followings means:

means for reading data obtained from the synchronized electrocardiogram tomoscintigraphy or from from a electrocardiogram tomographic imaging, said data corresponding to 3dimensional images at different time bins, said images being defined by pixels;

means for determining for at least a part of the second portion of the image an activity for at least a part of a cardiac activity cycle period;

means for normalizing the activity at each time bin in function of said determined activity for said part of the second portion of the image;

means for determining a rigid model comprising a reference valvular plane and a reference septum;

means for determining for each time bin, the valvular plane and the septum;

means for determining, for each time bin, the correction movement for matching the valvular plane and the septum at the considered time bin with the rigid model;

means using the correction movement for correcting the activity of the pixel at each time bin;

means for determining the time bins for the end-systole and the end-diastole;

means for determining the phase and amplitude of pixels of the 3dimensional images;

means for segmenting the images in region of interest selected in the group consisting of ventricles and auricles;

means for temporal and spatial filtering;

means for labeling the ventricles and the auricles means for computing at least a parameter selected from the group consisting of activity curves, thickness of the septum, ventricular movements;

means for determining of 2D representations of activity curves, and means for displaying results or one or means executing several processing steps of one or more of the programs of the invention (1 to 11th objects of the invention).

The invention has still for object an apparatus for synchronized electrocardiogram tomoscintigraphy or for electrocardiogram tomographic imaging, said apparatus comprising a computing system for executing the treatment of data obtained from synchronized electrocardiogram tomoscintigraphy or from a electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said computing system comprising at least means for executing one or more of the programs of the invention and/or one or more methods according to the invention, said apparatus comprising one or more of the following means:

means for reading data obtained from the synchronized electrocardiogram tomoscintigraphy or from a electrocardiogram tomographic imaging, said data corresponding to 3dimensional images at different time bins, said images being defined by pixels;

means for determining for at least a part of the second portion of the image an activity for at least a part of a cardiac activity cycle period;

means for normalizing the activity at each time bin in function of said determined activity for said part of the second portion of the image;

means for determining a rigid model comprising a reference valvular plane and a reference septum;

means for determining for each time bin, the valvular plane and the septum;

means for determining, for each time bin, the correction movement for matching the valvular plane and the septum at the considered time bin with the rigid model;

means using the correction movement for correcting the activity of the pixel at each time bin;

means for determining the time bins for the end-systole and the end-diastole;

means for determining the phase and amplitude of pixels of the 3dimensional images;

means for segmenting the images in region of interest selected in the group consisting of ventricles and auricles;

means for temporal and spatial filtering;

means for labeling the ventricles and the auricles means for computing at least a parameter selected from the group consisting of activity curves, thickness of the septum, ventricular movements;

means for determining of 2D representations of activity curves, and means for displaying results or one or means executing several processing steps of one or more of the programs of the invention (1 to 11th objects of the invention).

BRIEF DESCRIPTION OF THE DRAWINGS

FIG. 4 is a view explaining the bullseye view of the left ventricle;

FIG. 5 is a view explaining a bullseye view of the rigth ventricle;

DESCRIPTION OF PREFERRED
EMBODIMENTS
DESCRIPTION OF THE HEART

Figure 1:
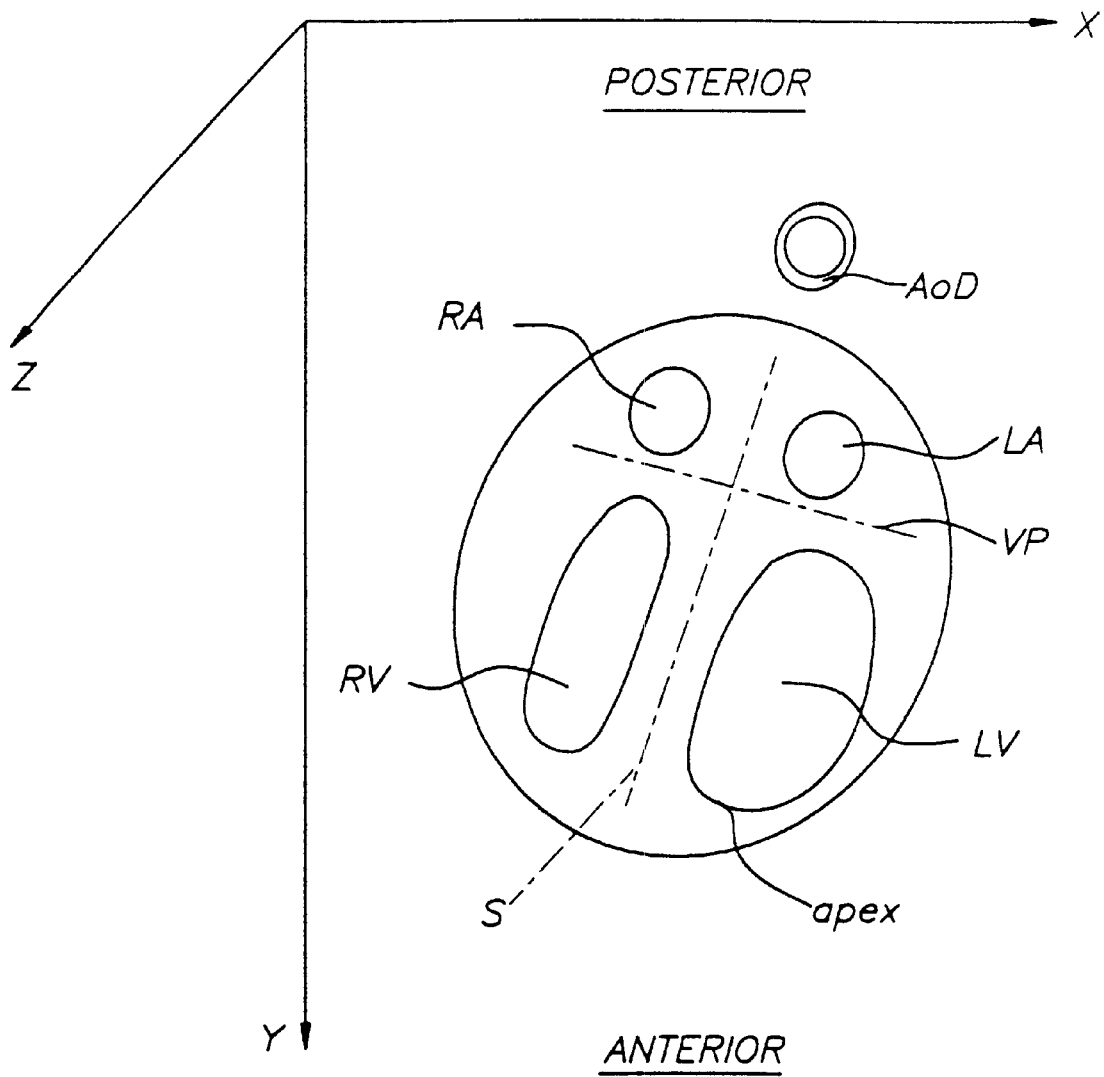
FIG. 1 is a schematic view (transversal section) of a heart.

The heart shown schematically in FIG. 1 comprises: a left ventricle LV, a right ventricle RV, a left auricle LA, a right auricle RA, an aorta descendens AoD, a spleen Spl, a septum S located between the ventricles LV and RV and between the left and right auricles LA and RA, and valves between the ventricles and the auricles, said valves being located in a valvular plane VP.

The ventricles have a base located in the valvular plane VP and an apex at its opposite end (lower and anterior).

The image points of the heart or pixels are defined by their position xi,yi,zi along respectively the axis X (right to left of the patient, face upside, i.e. left to right of a 2D image), the axis Y (anterior to posterior of the patient, i.e. top to bottom of 2D image) and the axis Z, the later being directed towards the feet of the patient. The 3D heart views obtained from the tomograph is thus a combination of successive slice view (2D slice zi).

In the right portion of the heart, the blood enters the RA, via the mitral valve the RV, via the pulmonary valve in the pulmonary aorta.

In the left portion of the heart, the blood enters the LA, via the tricuspid valve the LV, via the aortic valve in the aorta descendens.

Systole is the period in which the LV and RV contract rapidly, their volume decreasing rapidly, while LA and RA fill up gradually, causing a global movement of the substantially rigid valvular plane towards the ventricular side of the heart.

Diastole is the period in which LV and RV expand.

The tomograph with electrocardiogram, such as the tomograph sold under the name "trionics", by . . . , gives a series of reconstructed images, defined by the activity for each pixels xi,yi,zi at a time bin ti. These reconstructed images can therefore be given in a 4D matrix (matrix with Nx (number of pixels along the axis X)×Ny (the number of pixel of the image along the axis Y)×Nz (the number of pixels along the axis Z)×Nt (number of time bins for a heart cycle) data) or a 5D matrix or even more, when several parameters are measured.

Figure 2:
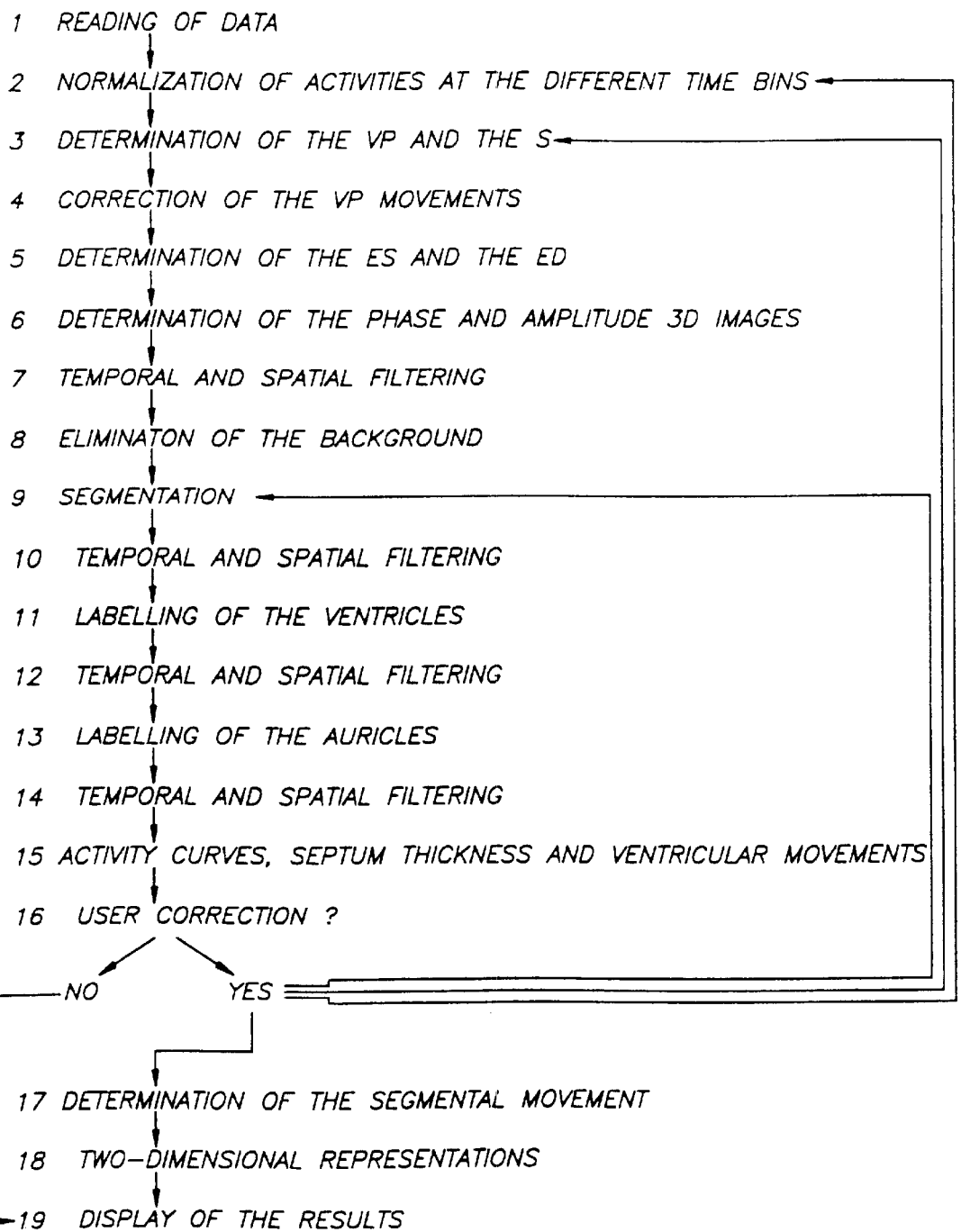
FIG. 2 is a general flow chart of a computer process of the invention.

FIG. 2 gives a general flow chart of a computer process of the invention for the treatment of data from a tomoscintigraphy coupled with an electrocardiograph.

The computer process is multidimensional and is provided in the first instance in 4 or 5 dimensions (the 3 spatial dimensions, time and the charge of the work an/or pharmacodynamical test and/or pacemaker activation). For descriptive convenience, in this case, the basis version (i.e.: in 4D: the 3 spatial dimensions and the time) will be described. Extension to 5 or more dimensions presents no notable algorithmic problems since the main difficulty (heterogeneity of the dimensions considered) has already been addressed in the 4D version (in which time has characteristics different from those of space).

To assist easier comprehension, the program can be subdivided into a number of stages, most of which take place automatically and can be carried out in batch processing. Some of these stages are interactive and allow the user to analyze and/or correct the results. These stages may or may not all be carried out, depending on the default values selected and on whether the data have undergone prior treatment, and the order in which they are listed below is just one example among the possible sequences. At each stage a failsafe is available, which in the event that the program has been interrupted, allows it to be started again at an intermediate stage without necessarily having to go through the whole thing again.

When meaningful, the extension to 5D will be described at the end of the description of each stage.

We can distinguish 16 stages:
Stage 1: Reading of Data

In said stage, 2D horizontal slices are read. These slices are pictures obtained from a tomographic detector (in our preferred embodiment, a gamma or a PET-camera) synchronized with an ECG. In a first pre-step, the camera registers multiple images, corresponding, for each incidence of the acquisition, to the sum of the counts, for each pixel, registered during this part of the cardiac cycle and during the duration of the incidence. In a second pre-step, all these incidences, for each time interval, are 3D computed to create a reconstruction of the original object. In a third pre-step, the horizontal slices of these volumes, created for each time bin, are saved on a computer disk. The reading and the check of these slices compose the first stage of the method. Warnings are issued for possible bad quality of the acquisition. Several controls are possible, for example:

based on the header information of the image, a warning can be issued if the number of acquired normal heartbeats is low compared to abnormally long or short heartbeats.

Also based on the header information, and supposing the acquisition was done with a multiple head camera, a warning can be used if some heads are not used or have not functioned during acquisition.

the image can be checked for acquisition truncation. This can be done by adding up all the 2D slices over time and z-axis, and checking the corners for circular segments with zero intensity.

the signal to noise ratio (SNR) can be estimated (for example using the method described further; see XXX) and a warning can happened if this parameter is too low Other possible controls are possible and can be integrated in the program.

When a warning or error message or signal is emitted by the program, the user of the electrocardiogram-tomograph is able to correct one or more parameters thereof, exept the parametes concerning the quality of the acquisition.

Stage 2: Normalization of the Image Data Activities at the Different Time Bins:

Due to the physiological variability of the length of heart cycles, and since the time bin interval is maintained constant during the whole acquisition, the activity during a different number of heart cycles will be accumulated in the different time bins. If the cycle length is longer that the mean cycle, the end of this particular cycle will generally not be taken into account. If the particular cycle is shorter than the mean cycle used to determine the time length of the time bins, the next cycle will start before the completion of all the time bins, resulting in less counts registered in the late time bins compared to the earliest. This lower intensity does not reflect the reality and will created disturbances in the subsequent filtering, segmentation and extraction of clinical parameters, hence the need to correct this artifact.

We do this by normalizing the total activity in a region of the image where there is little chance to find parts of the heart and of the great vessels, in which there is real fluctuation of the activity during the heart cycle. In our preferential implementation we consider the lowest four slices, which should only include the spleen, the lower part of the Aorta Descendens, and background. Another possible region is the lower right corner of the image, including only spleen and background. Still another possibility would be to count only the activity in the background, i.e. the total activity in all pixels for which the activity remains under a threshold during the whole of the heart cycle.

This normalization step can be operated in the preferred embodiment by the following algorithm:

The program calculates the total activity for each pixel xi,yi,zi of the lower 4 slices for each time bin, as well as a reference activity as being the average of the said total activity per time bin, for the first half of the time bins.

From said average total activity and reference activity, the program calculates a correction factor for each time bin, said correction factor being equal to said reference activity divided by the total activity for the time bin considered.

The activity of the matrix $[a(x_i,y_i,z_i,t_j)]$ is then corrected for each pixel by the correction factor for the time bin to which said pixel belongs (the activity of each pixel is multiplied by the correction factor).

The program generates in this way a normalized activity matrix normalized $[a(x_i,y_i,z_i,t_j)]$ in function of the time.

For a 5D-analysis imaging, an additional normalization should be made between the different effort bins of these $5^{th}$ dimension, taking into account the time of acquisition of each effort bin and correcting for the nuclear decay (hence the total activity) during the time interval between the acquisition of the different effort bins, and this according to the well-known formula:

Stage 3: Determination of the Position of the Heart Cavities and of the Valvular Plane and the Septum During the systole, there is a global movement of the heart, the VP undergoing a recoil movement towards the ventricular portion of the heart. To calculate effectiveness of each portion of the heart muscle, the program takes as assumption that VP does not move or is rigid (is not muscular), but that each muscle portion of the heart moves. Hence, the program has to correct the images for this global movement of the heart.

The program will thus make a change of reference system, going from the reference system fixed to the thorax to a reference system fixed to the VP. The program has thus to determine for each time bin the motion (3D rotation+3D translation) so as that the VP remains substantially immobile or rigid or fixed in the image matrix.

Hence, the program has to detect the rigid portion of the heart, VP+posterior inferior part of the Septum S. VP will be defined as being the intersection between the auricular region (ROI Region of Interest) and the ventricular region. The septum S will be considered as being the intersection of the left and right region of the heart.

The detection of these four regions of interest (ROI) is thus of major importance. However, since the spleen (Spl) and the aorta descendens (AoD) are often visible and disturb the algorithm, their region of interest ROI will preferably first be determined by the program, and the other 4 regions of interest ROI (ventricles LV, RV and auricles LA, RA) will compare the remainder of the image.

According to a specific and preferred computer program, said regions of interest for the aorta descendens and for the spleen are determined as follows:

Labeling the Aorta Descendens (AoD)

To detect the spleen (Spl)- and the aorta descendens (AoD), the 4D input image (activity data at each normalized time bin—matrix $[a(x_i,y_i,z_i,t_j)]$) is reduced to a representative 3D image, called MAXIM1, preferably by creating the image of the maximum value over time of each pixel of the input image. Possible alternatives would be the average or the median image over time or at a specific time bin.

For the determination of the Spl, this should not change anything since the organ is not supposed to vary over time. For the aorta descendens (AoD), its position is not supposed to change much over time, while the intensity of the activity data of said aorta follows a profile that should be substantially in synchrony, but not very variable, with the heart cycle. By taking in our preferential implementation for each pixel $(x_i,y_i,z_i)$ the maximum over time, the program creates an image where the intensity is maximum and hence where the aorta descendens (AoD) is most visible.

For working with the regions of interest (ROI), a watershed segmentation step (see for example #) on the matrix MAXIM1 is carried out (said segmentation being not carried out on the gradient-transform of the of the input image as it is usually the case to determine the borders of an organ, the reason is that the program is adapted for finding the ROI extending up to each other and not up to the border of the organ) (alternatively the edgmentation algorithm # could even be used without prior gradient calculation). This results in a 3D-segmentation matrix SEGIM1, whereby each 3D maximum of MAXIM1 becomes a seed root (central point) of a segment surrounded by valleys separating it from nearby segments.

The aorta descendens (AoD) is detected by visualizing a substantially vertical, roughly circular tube in the central posterior part of the image. Hence, in all the transversal slices $(z_i)$ of MAXIM1, the 2D position $x_{pi},y_{pi}$ of the maximum activities is determined, and a series $(x_{pi},y_{pi},z_i)$ of 2D maxima positions $(x_{pi},y_{pi})$ that follows each other smoothly from one slice to another over most of the slices and with great intensity is determined.

From the slice, where the AoD is usually the most easily visible, the program determine in each successive slice the 2D maximum (xmk,ymk) which is closest to the 2D maximum in the previous slice and which has the highest intensity.

The program, for example, starts from the slice Z(2Nz/3) and a starting point of the AoD at (Nx/2,Ny). The program determines the 2D maximum (xmk,ymk) for which MAXIM1(xmk,ymk)−((max(maxim1)/Nz)×1.9×d((xmk, ymk),(xrl,yrl)) is maximum, in which D(p1,p2) is the Euclidean distance between the pixel p1 and p2, Max(maxim1) is the maximum of Maxim (xrl,yrl) is an approximate position of the center of the AoD.

Normally, the program uses for the first slice Z2Nz/3, the point (Nx/2,Ny), and

When going up the stock of slices: (xm,k+1,ym,k+1), and

When going down the stock of slices: (xm,k−1,ym,k−1).

When any of the 2D maxima (xmk,ymk) is also a 3D maximum in MAXIM1, the program considers this point as being a root of a segment of SEGIM1, and said segment is labeled as part of the region of interest AoD.

When all slices $z_i$ have been processed, the Aorta descendens (AoD) is defined as being the union of all the selected segments or circles ($x_{AoDi}$, $y_{AoDi}$) determined in the various slices ($z_i$).

Labeling the Spleen (Spl)

The spleen is determined for example from the 3D matrixes MAXIM1 and SEGIM1, previously determined. The spleen (Spl) is considered to be a bright, large region in the lower (high z value) posterior (high y value) left (high x value) part of the image. Hence, a search is carried out for all pixels located outside the regions of interest ROI (AoD) and outside a quarter cylinder centered on the top (y=0) left (x=0) comer (anterior right) of the image and with a radius of 105% of the image width (Nx pixels)—leaving only a region in the posterior left part of the image. At each level or for each slice zi, in said defined portion of the image, seeds of segments (3D maxima) with intensity larger or equal to a threshold (in our preferential implementation 90% of max (MAXIM1 ) is searched. The corresponding segments ( formed by the pixels $x_{qi}$, $y_{qi}$, $z_i$) are considered part of the spleen ROI (Spl), unless they touch the anterior (y=0) or right (x=0) border of the image.

Labeling of Valvular Plane (VP) and Septum (S)

Regions of interest of left ventricle (LV), right ventricle (RV), left auricle (LA) and right auricle (RA), are detected, said regions of interest being separated by VP and Septum (S). Preferably, the valvular plane (VP) and the septum (S) are identified separately, but following similar processing chains. For both, the determination is based in this example on the matrix corresponding to the normalized 4D input image (normalized matrix [ a ($x_i,y_i,z_i,t_j$)]) after subtraction of the ROI (AoD) and ROI(Spl), called the amended 4D input image or amended matrix.

An alternative to this preferred method is, to determine by iteration a rotation angle which maximizes the total activity in a given quadrant of the matrix, doing this in succession for different spatial angles.

Labeling of Valvular Plane (VP)

The so-called corrected 4D input image is submitted to a filtration, in our preferential implementation to a 3D spatial gaussian filtering with sigma =1.8 * PS. This is advantageous for decreasing the influence of noise.

A representative 3D image (MAXIM2) is again computed, preferably by taking pixel per pixel the maximum over time of the filtered amended 4D input image.

On the filtered amended 4D input image, a matched filter algorithm is applied, with as model the time evolution of the pixel with the greatest amplitude in the filtered image. The program determines the pixel with the maximum variation over the time and considers this variation of activity over time as model for the matched filter. In possible embodiments, the program could take a fixed model representing well the time-evolution of a pixel near the heart wall, or a cosine—simplifying the matched filter to an Fast Fourrier Transform (FFT) #. The program determines by means of said matched filter (or possibly by means of the Fast Fourrier Transform) for each pixel an Amplitude of the variation of activity over time and a Phase of the variation of activity over time. The 3D-power image (POWERIM) or matrix gives the amplitude determined for each pixel, while the PHASIM image or matrix gives the phase for each pixel. The POWERIM matrix is then subjected to a watershed (preferably to a edgmentation) segmentation algorithm (SEGIM2). (the watershed is carried on POWERIM and not on the gradient of POWERIM, the 3D maximum of POWERIM being the roots of the segments).

Advantageously, so as to reduce the number of segments to consider, segments of SEGIM2 are merged. This could be done for example on the basis of the difference in gray value between adjacent segments, or taking into account the length of their common border, or segmenting into two phases of 180°, one of them centered round the principal mode of the phase histogram , or the combination of two or more of these methods (for example, powerim threshold by a value of the highest activity along the time, or by the phase image). In a preferential implementation, the program uses however the following method: since the segments are the results of the watershed segmentation algorithm, valleys separate them all. For merging the segments which are least significant, the merging will be carried out for merging first the ones with the smallest activity in MAXIM2. Since the four cavities of interest are usually all four represented in the middle portion of the horizontal slices, the program will first merge the segments that are not present in this central portion of the slice. The program will merge a segment to its neighbor from which it is least distinctly separated by a valley, i.e. the least deep valley, i.e. the valley where the maximum of the valley is the highest. The amplitude or height of the valley between two segments is determined by the value of amplitude given in Powerim for the pixel corresponding to the valley. A same amplitude value will be given for the merged segments, namely the value of the first segment considered for merging purposes.

In summary, the computing program will merge the segments successively, from the segments not present in the central portion of the slice to the segments present in the central portion of the slice, and from the smallest (in activity) to the largest. Each segment to be merged is merged to its neighbor with whom it has the highest maximum in their valley. Since there are sometimes spurious maxima in the power image POWERIM, the computing program merges segments of POWERIM until a limited number of segments are left, for example 6 or more, preferably, 6, giving the 3D image called Merg.SEGIM2.

Next, the program labels those segments as being Ventricular or Auricular, the border between the two regions defining the VP. As there is a great variability in medical images—particularly when cardiac pathologies have to be taken into account—more than one labeling method are used in the program. Via a weighted vote between the labels obtained from labeling method, the program gives a final labeling. In a preferred embodiment, the three labeling methods are for example the followings:

1) Method 1: the merging procedure described previously is further carried out on the matrix POWERIM until only two segments are left (exploiting the power information of the matched filter), and label the most frontal left segment as Ventricular;
2) Method 2: the segments of Merg.SEGIM2 are labeled according to the position of their center of gravity (COG) (weighted with the MAXIM2 value of each pixel) with respect to the frontal right to posterior left diagonal going through the COG of the whole heart (weighted with the MAXIM2 value of each pixel), whereby exploiting the geometric information in the input image, segments with COG frontal left of the diagonal being labelled as Ventricular;
3) Method 3: the segments of Merg.SEGIM2 (6 segments remaining) are merged from smallest to largest (in volume) until only two segments are left; the merging is carried out between segments whose average phase is most similar (exploiting the phase information of the matched filter, PHASIM), and label the most frontal left one as Ventricular.

Other methods are possible for said labeling, for example a possible method could be based on a Probability Distribution Map # instead of the diagonal passing through the COG of the heart, said Probability Distribution Map giving a pixel wise probability to find each label. Other possible methods are for example the merging segments on the base of the depth of the valley between them in the representative 3D image (MAXIM2), or in each of the 3D time bins image, or to merge on base of the average activity, or the combination of two of more of these methods, etc.

As a result, for each of the remaining segments of Merg.SEGIM2, the program gives, in case of 3 labeling methods, three labels taken from the two possibilities Ventricular or Auricular; voting attributes to each segment a single label. The vote could eventually take into account weighting factors between the methods, and/or a measure for the goodness of fit for the labeling result of each method per segment.

The program defines the limit between the ventricular and auricular portions as the VP, i.e. the pixels between the ventricular portions and the auricular portions as being the valvular plane.

The program defines at the different time bins the limit (pixel $(x_i, y_i, z_i)$) between the ventricular and auricular portions as the ventricular plane VP.

Labeling of the Septum

The next step of the method is to apply to the so-called amended 4D input image (normalized matrix $[a(x_i, y_i, z_i, t_j)]$) after subtraction of the ROI (AoD) and ROI(Spl)) a 3D spatial filter (in the preferential implementation with a more important filtration than for the labelling of the ventricle, for example with a gaussian filter with sigma =1.33 *PS). The 4D matrix or image is then treated by the program so as to define a 3D image (MAXIM3).

Said representative 3D image (MAXIM3) is again computed (again, preferably by taking pixel per pixel the maximum over time of the filtered input image or matrix. MAXIM3 is then subjected to a watershed (or edgmentation) segmentation algorithm (SEGIM3).

To reduce the number of segments, the program merges segments of SEGIM3 in the same way as the segments of SEGIM2 , but this time, in the preferred embodiment, considering the valleys in MAXIM3 instead of the valleys in POWERIM. In this preferential embodiment, the merging ends when 4 segments are left. The program creates then a matrix with merged segments, MERG.SEGIM3.

This could also be done for example on the basis of the difference in gray value between adjacent segments, or taking into account the length of their common border, or segmenting into two phases of 180°, one of them centered round the principal mode of the phase histogram (pour être coherent avec le provisional), or combining these methods (for example, powerim threshold by a value of maxim3, or by the phase image).

Next, the program labels those remaining segments with different labeling methods, and votes between them to obtain a final labeling between Left and Right.

The vote could take into account weighting factors between the methods, and/or a measure for the goodness of fit for the labeling result of each method per segment. In the preferred embodiment, the 3 following labeling methods are used:
1) Method 1: the merging procedure described previously is carried out until only two segments are left (exploiting the power information of the matched filter), and label the most frontal right one as Right;
2) Method 2: the segments are labeled according to the position of their COG (weighted with the MAXIM3 value of each pixel) with respect to the frontal left to posterior right diagonal going through the COG of the whole heart (weighted with the MAXIM3 value of each pixel), whereby exploiting the geometric information in the input image, segments with COG frontal right of the diagonal being labelled Right;
3) Method 3: the remaining segments are divided according to their position toward the VP—two on one side, two on the other; and then merging them two by two by taking each time two on opposite sides of the VP and with the largest contact area between them (exploiting the VP information), and label the most frontal right one as Right.

Other possible methods can be applied. Such possible methods are, for example, the use of a Probability Distribution Map # instead of method 2; the merging of the segments on the base of the depth of the valley between them in the representative 3D image (maxim3), or in each of the 3D time bins; the merging of the two segments with the highest amplitudes, considering them as the ROI of the left or the right auricle (pour 8tre coherent avec le provisional etc.

As a result, for each of the remaining segments of the matrix MERG.SEGIM3, the program gives, in case of 3 methods, three labels taken from the two possibilities Left or Right; and votes then for each segment a single label: Left or Right.

The program defines then the limit between Left and Right as being the septum S, i.e. the pixels between Left and Right as being the septum.

The program defines then the limit between left and right as being the septum S, said septum being defined at the different time bins by the pixels $(x_{12}y_{12}, z_{12})$) both groups is the S.

Knowing the valvular plane and the septum, the program determines the region of interest, i.e. one or more regions selected among LV, RV, LA, RA.

Stage 4: Correction of the VP Movement:
A) Determination of the Rigid Model

The normalized 4D input image (matrix [normalized $a(x_i, y_i, z_i, t_j)$]) is submitted to a 3D spatial low-pass filtering (in the preferential implementation a gaussian with sigma =1.33 * PS). A representative 3D image (MAXIM4) is computed, preferably by taking pixel per pixel the maximum over time of the filtered input image. The maximum value "max(MAXIM4)" of MAXIM4 is determined by the program.

From the results of stage 3, two groups of pixels are selected, a first one Vpi : are part of VP, are in the central part of the image (for x comprised between Nx/4 and 3 Nx/4, for y comprised between Ny4 and 3Ny/4, and for z comprised between Nz/4 and 3Nz/4), are part for which MAXIM4 is higher than a threshold (for example more than 50% of the maximum activity of MAXIM4), and a second group Si which are part of S, are in the control part of the image, parts for which MAXIM4 is higher than a threshold, which are part of the ventricular region of interest, which are not greater than a threshold from a pixel of the group Vpi.

The distance of the pixels of the matrix to the pixels of the group Vpi can be computed by using a distance transform. In a preferred embodiment, a chamfer 10,14,17 distance is used and the threshold is set to (70/2.54)×PS. Since the intensity of the filtered input image is supposed to be low at VP and S and to increase gradually from there, the program uses as rigid model a distance transform # (DISTIM2) of the image consisting of the pixel VPi and Si restricted to the regions around the VPi and Si, i.e. the pixels of DISTIM2 with value lower than a certain threshold (in our preferential implementation: 5 pixels of 2.54 mm). Since the superior part of the proximal interventricular septum is still somewhat muscular, the program could possibly, but advantageously, limit the part of this proximal interventricular septum taken into account in the rigid model to the inferior portion of it.

The ventricular plane and the portion of the septum adjacent to the ventricular plane is therefore defined by pixels corresponding to the points of minimum activity (xb,yb,zb) with a threshold of 5 pixels left, right, up and down (xr,yr,zr).

b) Determination of the Rigid Transform to Match the Rigid Model

For each successive time bin, the program determines the rigid 3D transformation (3D rotation +3D translation) which fits best the data of said time bin with the rigid model, and this by minimizing a cast function with respect to the six parameters (3 rotations and 3 translations) of the rigid transform.

To decrease the influence of noise, a 3D spatial low-pass filter was first applied to the input image (in our preferential implementation a gaussian filter with sigma =1.33 * PS).

To determine the quality of the match between the input image and the rigid model, the program takes, in its preferential implementation, as optimization function the sum, over all the pixels of the rigid model (xr,yr,zr), of the square differences between the model (xr,yr,zr) and the input image $(x1,y_1,z_1; X_{12},y_{12},z_{12})$. For the optimization of the 3D transformation, the program follows, in our preferred implementation, a single slope algorithm for each successive parameter (three translations and three rotations) with step values decreasing from 1 to 0.5 to 0.25 to 0.125. Others optimization strategies can be used, for example the method of "simulated annealing": for each time bin in succession, a search in the 6D space of 3 rotations and 3 spatial translations is made to minimize at one and the same the sum of the (eventually squared) activities differences and the movement amplitude. Another optimization strategy will be to perform first a rough correction by a double translation: the centroid of the VP is corrected, one time bin at a time, for a translation perpendicular to the VP and S is corrected for a translation perpendicular to S; a finer correction in the 6D space of spatial translations and rotations is obtained by searching iteratively for a minimum of the 3D distance between the VP/S combination in the considered time bin and the reference matrix. It should be noted that the total S and VP are not necessarily used at this stage and that the VP movement amplitude is estimated, for example, by the sum or average of the activities differences between the image elements of the zone considered, which may or may not be expressed as a percentage of the initial value, the final value, or the average of those values.

Advantageously, the program has a control step, in order to avoid translations of more than 5 pixels and rotation of more than 10°. In case, the translation is more than 5 pixels or the rotation is more than 10° for the time bin $t_j$, the program determines a theoretical translation and rotation, as being an interpolation of the translation and rotation of the most nearly time bins with accepted translation and rotation parameters.

For example, the program determines, by iterative approximations, first the translation(s) in the three directions necessary for minimizing the sum of activity of the pixels of the rigid model of the difference of pixel area (xs,ys,zs) between the model (xr,yr,zr) and the input image $(x_1,y_1,z_1; x_{12},y_{12},z_{12})$, and then determines the rotation around the three perpendicular axis necessary for minimizing the sum of activity of the pixels of the rigid model of the difference of pixel area (xs,ys,zs) between the model (xr,yr,zr) and the input image $(x_1,y_1,z_1; x_{12},y_{12},z_{12})$. The matrix of the input activity data at time bin tj is then submitted to the translation (s) and rotation(s) determined for correcting the actual position of the VP and septum at time bin tj in view of the model position. The program defines then a matrix with the corrected orientation of VP and SP over the time (CORRECTED MATRIX).

In a 5D-analysis and in more others dimensions, the rigid model should be computed on the basis of the first 4D-bin; each 4D-bin (for example, each time-effort bin) will have to be corrected individually.

Stage 5: Determination of the "time bins" for End-Systole (ES) and End-Diastole (ED)

The preferential implementation is to first apply again a filter (sigma=) to the normalized input image (same value for sigma), and then the program determines the two most different time bins, according to the formula: t1, t2=arg $\max_{ta,tb} (\Sigma_{x,y,z}$ abs(image(x, y, z, ta)−image(x, y, z, tb))). The program determines thus the time bins t1 and t2 between which the difference of activity of all the pixels is maximized. Of t1 and t2, ES is the one closest to the central time bin (at least if the original acquisition was synchronized on the R-wave of the ECG, what is usually the case. ED is the other one.

Other possible definitions for ED and ES could be: (1) fixed time bins (the last one being ED, the middle one ES in the case of trigger on the R-wave of the ECG); (2) defining ED/ES as the time bins with respectively maximal/minimal total activity in the ventricular part of the image (3) if the VP determination has not been carried out, to use the most probable matrix quadrant for the determination of the ventricular area.

This step 5 can possibly (also) be later carried out in the method.

Stage 6: Determination of the Phase and Amplitude 3D Images:

The global heart motion correction allows now a motion-free analysis of the periodicity inside the corrected matrix. The Fast Fourrier Transform (FFT) # is a classical way to perform this analysis and create from a 4D-motion corrected data a 3D parametric image of 2 of the extracted parameters, namely the phase and the amplitude. Alternatives to this method would be the previously reported (see stage3) method of matched filters, also the wavelets method #. The FFT or matched filter is applied on a low-pass filtered version of the movement corrected input image, as obtained at the end of the stage 4.

This step can possibly be carried out later in the program.

In case of the use of more than 4 dimensions, a FFT has to be computed for each individual 4D-bin,.

Stage 7: Temporal and Spatial Filtering:

The next step is a spatial and temporal filter carried out by the program on the corrected normalized image (corrected MATRIX). In a preferential implementation, the spatial filter is a gaussian with a sigma that is inversely proportional to the Pixel Size in mm (PS) and dependent of the Signal-to-Noise Ratio (SNR). The SNR is considered inversely proportional to the number of extrema in the lightly pre-filtered image. A formula which gives the best compromise between accuracy of quantification and reasonable number of segments is: sigma=$(2.56/PS)\times$(nummax(gauss(inim, sigma= 1.0))$^{(2/3)}$), in which (nummax(gauss(inim, sigma=1.0)) is the number of maxima in the normalized image after a gaussian filtration with a sigma equal to 1.

In a preferential implementation, the temporal filter is a gaussian filter that is inversely proportional to PS and proportional to a user-definable time-to-space ratio (TSR). A advantageous formula for the filtration is sigma=1.64 * TSR / PS, with TSR=1.2.

Additional filtering along the supplementary dimension(s) should be performed in case of more than 4D-study.

Stage 8: Elimination of the Background:

The next step of the program is a thresholding step for partly eliminating y the background. In a preferential implementation, this threshold is put at 20% of the maximum value of the filtered image obtained from the stage 7. This step is advantageous for reducing the number of segments produced and the segmentation time. Due to the low value of the threshold, it does not influence the borders of the segments.

An alternative of this is uniform subtraction of this constant value, while negative values are set equal to zero. The value to be subtracted or excluded can be determined either as percentage of the maximum value, or as a percentile of all or part of the population of image elements, or from a determination in a specific zone, as described is stage 2 (normalization of the time bins).

The image obtained after said filtering is called hereafter <<INPUT IMAGE or MATRIX>>.

The steps or stages 1 to 4, advantageously associated with one or more stages 5 to 8, are preprocessing steps or stages which can be used as such in other program for treating data of a ECT tomograph. For example, the steps or stages 1 to 4 are preprocessing steps or stages of a computing program determining from the CORRECTED MATRIX parameters or views or images of the heart or of a function thereof.

The following stages are preferred stages for giving an improved analysis.

Stare 9: Segmentation of the Whole Matrix:

The image is segmented preferably with a 4D watershed algorithm (applied this time on the gradient image as the program needs to determine the border of the cavities). Possibly, the program could use an edgmentation algorithm as an alternative. The gradient has to take into account the TSR (time-to-space ratio) along the 4$^{th}$ dimension. The advantage of the method is to result in regions with closed contours (as opposed to edge-detection algorithms) and to produce an over-segmentation, which makes later user intervention easier because limited to re-labeling instead of re-segmenting.

In case of more than 4 dimensions, the watershed algorithm is immediately extendable in more dimensions, taking into account an additional ratio (for example an effort-to-space ratio) in addition to the time-to-space ratio (TSR) already used in the gradient calculations.

This step or stage using the images at ED (maximum volume of the ventricles) and ES (maximum volume of the auricles) enables to defines respectively the maximum segment of the ventricles and the maximum segment of the auricles.

Stage 10: New Temporal and Spatial Filtering:

This stage is only necessary if the filtering occurring at stage 7 is not efficient enough or not applied or if the filters needed for auricles and ventricles are too different as to have a strong common basis. It could happened if the amount of registered counts used to create the original image is dramatically low, creating very noisy image not sufficiently smoothed by this first filtering. In the pre-set of the method, the operator, if he (she) feels that the filtered image will be still too noisy and thus confusing, could like to have the ability to activate this supplementary filter from the begin of the processing. In a preferred implementation, this filter, only used for the ventricle labeling, is not used. Additional filtering along the supplementary dimension(s) could be performed in case of more than 4D-study.

Stage 11: Labeling of the Ventricles

First, the ROI are again determined as in stage 3 , but this time on the base of the movement corrected input image.

Next, all 4D segments (as determined in Stage 9) whose roots fall within a mask region, are selected as either left ventricular (LV) or right ventricular (RV), according to the value of the mask. This mask is computed in following way.

From the 3D input image corresponding with the time bin where the ventricles are the most visible—namely ED—the part corresponding with the ROI of the AoD, Spl, RA, and LA are removed. This image is segmented with a 3D watershed algorithm (applied on the gray value image and not on the gradient image). Resulting segments cut at the border of the image (i.e. with root on the border of the image and corresponding for example to the large vessels) are removed, as well as all segments that are isolated in the background (not touching any other segment). Remaining segments are labeled as either LV or RV, depending on the ROI in which their root falls. Next all the pixels that are on the border between LV and RV are removed, after which a morphological erosion and dilation are performed. This later step is advantageous for removing possible pixel bounds by between the two regions. This results in a 3D mask with each pixel of the mask having a label of either LV or RV.

All 4D segments whose roots fall within this mask are labeled according to the label of the mask.

The study with more than 4 dimensions are analyzed in the same way, labeling the roots of the 5D segments according to the 3D mask.

The program advantageously further computes the center of gravity of LV and RV, center of gravity weighted on the activity of the considered segments.

Stage 12: New Temporal and Spatial Filtering

At this stage, the program applies advantageously a new filtering to the matrix of stage 7 or INPUT IMAGE for the preparation of the labeling of the auricles. This filtering is important if the resolution of the camera does not allow a so clear definition of the auricles as for the ventricles. In such a case, as well as in a preferential implementation, the program executes a filtration of the segmented image with a gaussian filter, sigma=0.9 * PS, which is applied on the matrix already filtered in stage 7.

Stage 13: Labeling of the Auricles:

The ROI as determined in Stage 11 are also used in this Stage.

Next, all 4D segments (as determined in Stage 9) whose roots fall within a mask region, are selected as either left auricular (LA) or right auricular (RA), according to the value of the mask. This mask is computed in following way.

From the 3D input image corresponding with the time bin where the auricles are the most visible—namely ES—the part corresponding with the ROI of the AoD, Spl, RV, and LV are removed. This image is segmented with a 3D watershed algorithm (applied on the gray value image and not on the gradient image). Resulting segments cut at the border of the image (i.e. with root on the border of the image and corresponding for example to the large vessels) are removed, as well as all segments that are isolated in the background (not touching any other segment). From the remaining segments, the one with center of gravity closest to the previously determined center of gravity of the LV is labeled as LA, and the one with center of gravity closest to the previously determined center of gravity of the RV is labeled as RA. If the same segment is closest to both LV and RV, the segment whose center of gravity is next closest to the COG of the RV is labeled as RA. Next all the pixels that are on the border between LA and RA are removed, after which a morphological erosion and dilation are performed. This later step is advantageous for removing possible pixel bounds between the two regions. This results in a 3D mask with each pixel of the mask having a label of either LA or RA.

All 4D segments whose roots fall within this mask are labeled according to the label of the mask.

The study with more than 4 dimensions are analyzed in the same way, labeling the roots of the 5D segments according to the 3D mask.

Stage 14: Temporal and Spatial Filtering:

As for stage 10, the program possibly carries a filtering of the 4D-matrix of the activities, such a filtering being advantageous if the filtering occurring at stage 7 is not efficient enough. It could happened if the amount of registered counts used to create the original image is dramatically low (or to low for the amount of bins used), creating very noisy image not sufficiently smoothed by this first filtering. In the pre-set of the method, the operator, if he (she) feels that the filtered image will be still too noisy and thus confusing, could like to have the ability to activate this supplementary filter from the begin of the processing. In our preferred implementation, this filter is not used.

Additional filtering along the supplementary dimension(s) could be performed in case of more than 4D-study.

Stage 15: Calculation of the Activity Curves, the Septum Thickness and the Ventricular Movements Next the determined labels are checked and a warning happens if one of the four cavities (LV, RV, LA, RA) touches the border of the image (which would mean that the cavity has been cut at acquisition of reconstruction and hence is incomplete, giving also wrong results for the further quantification). Another warning happens if the phases of the ventricular and auricular regions overlap (which might indicate wrong classification of certain segments, for example if a pathology is involved resulting in phase reversal).

The following part of this stage can equally well be carried out after stage 16 (the "on line part"), which can modify the labeling of segments or parts of it and then will require to reprocess the following parameters.

a) Activity Curves

On the basis of input image, segmented image plus label list, and phase image, a certain number of curves are computed and made available to the user to help him to inspect the results of the automatic program. In the preferential implementation, these curves are for example, one or more of the followings:

the total volume of each cavity in function of time;
the total activity in each cavity in function of time;
the global phase histogram;
the phase histogram for each cavity.

For 5D-studies or studies with more dimensions, time curves should also be computed for each additional (for example, Effort) bin, becoming in this case time-effort surfaces, which can be visualized either as a 2D image or as a wireframe 3D surface.

The phase activity is determined by means of the results of Stage 6.

b) Septum Thickness

The septum thickness is preferably computed with the heart in standardized position.

So the method and program will first determine the 3 rotation angles necessary to rotate the 3D images (individual time bins or results of Stage 6) in this position.

Usually, the heart is oriented in the input image with the left ventricular region in the top right part of the image. The standardized position is illustrated in the joint figure. Advantageously the program comprises instructions for computing a standardized position in which the heart is oriented with the long axis parallel to the y-axis (vertical), apex on top (low y values in image processing axes), and septal plane (valvular plane) parallel to the y,z-plane, with LV at the right (high x values).

For computing the rotation necessary for directing the heart image in its standardized position, the program first computes a representative 3D image (in the preferential implementation, the 3D-image of the average activity of the input image over time), then discard the pixels of the resulting image having an activity lower than a threshold. Then, the program applies a 3D watershed (preferably to an edgmentation algorithm) on the gray value image so as to obtain a 3D-segmented image. Finally the border segments and isolated segments are eliminated. The result is used as a mask on the thresholded gray value image. The program determines a sagittal rotation angle (rotation in the y, z-plane) as the angle (preferably between $-88°$ and $0°$) which maximizes the sum of gray values in the top right half of any slice, and a coronal rotation angle (rotation in the x, z-plane) as the angle (in the preferential embodiment between $-30°$ and $+30°$) with the same criterion (maximizing the sum of gray values in the top right half of any slice). An alternative would be to compute the two angles according to planar regression analysis of the VP as defined previously. Finally, the program determines the transversal rotation angle (rotation in the x, y-plane) as $90°$ —the angle of the Septum, said angle of the septum being defined by linear regression analysis in the x, y-plane of the Septal ROI.

In case of study in more than 4D, for example with the addition of stress as the $5^{th}$ dimension, the computing of the standardized position has to be done on each individual stress-bin, due to the possible variation of the position of the heart inside the chest for different levels of stress.

The heart is then rotated according to the 3 computed angles.

The calculation of the septum thickness can now be done, the heart being in the standardized position. The centers of gravity (COG) are calculated for both LV and RV, and only the slice with $z=(z_{COG(LV)}+z_{COG(RV)})/2$ is considered, which is the slice where LV and RV are closest to one another, hence septum is smallest. In this slice, the range lines (y values) where both LV and RV are visible are determined.

The shortest distance (along the x-axis) between LV and RV along those lines is defined as the septum thickness. When taking into account only the top third of the y range, the mid third or the bottom third, one obtain respectively the anterior, medium and posterior septum thickness (see figure).

Again, in case of images with more than 4 dimensions, the septum thickness has to be calculated for each additional (for example stress-) 4D-bin.

c) Ventricular Movements

The ventricular segmental wall motion can be studied from different ways. The FFT (see stage 6) can create a 3D-image of the parameters of the power and the phase. An improvement could be to use instead of them parameters coming from the matched filters: they should be more accurate, not making the assumption that the cardiac time activity curves will be sinusoidal. The preferred implementation is the use of the "slope method" to best characterize the local wall motion, chiefly because it quantifies a motion in absolute parameters, thus without influence of the quality of the rest of the heart or the artifactual motion of others organs inside the considered matrix like it could happened with the FFT.

The present slope method is derived from the slope method presented by #. The differences with this publication is the use of 3 or more dimensions, the adaptation to scintigraphic images and the use of the whole cardiac cycle at place of a limited time interval, which can be not influence in the pathology as well as it can, by the unique measurement, introduces an uncertainty in the results of the fit.

This now presented slope method used in the program compares (regionally, pixel-wise, via linear regression) the time evolution of the grey value of a pixel with the average time evolution of the pixels belonging to the current cavity and having and amplitude higher than a certain threshold. A global slope takes into account all time bins; a systolic slope takes only into account the time bins between ED and ES, and a diastolic slope the time bins between ES and ED. Only if the correlation coefficient ρ is positive, the program takes the resulting slope parameter into account; in case ρ<−0.9 the slope is termed "paradoxical".

The 2D displays of the different 3D parametric images (described in stage 18) can be prepared at this moment or delayed till after the eventual interaction with the user. A preferential implementation is to compute the 2D displays at this stage, to reduce the computing time if the user makes no modification of the automatic processing.

Stage 16: "on line" Part, Which Requires the User's Intervention

After the automatic processing, the user can inspect the different results of the automatic procedure and restart this procedure wherever he deems is necessary.

First, he can inspect the time bin correction by checking the evolution of the correction factor with time. If necessary (for example if the correction factor would not increase with time), he can adjust the profile and restart processing from there (Stage 2). This has not proved to be necessary in practice.

Next, he can inspect the global movement correction by checking the time evolution of the six parameters (3 translations and 3 rotations) or viewing the image before or after movement correction in cine mode, with VP and S lines superposed. If necessary, he can apply a filter (gaussian or median) to the individual correction factors, or reject the whole movement correction.

Next, he can perform a manual reorientation of the heart. The reprojection of the craniocaudal view is displayed and a cross is drawn: the user orientates the major axis of the cross roughly in line with the major axis of the heart. After validation, the re-projection of the left sagittal view is displayed and a cross is drawn: the user again orientates the major axis of the cross in line with that of the heart.

The fourth inspection involves the labeling of the image. He can control the labeling globally by looking at the four curves produced during the quantification step. If something seems wrong, he can check individual labels by visualizing all the non-reoriented slices (2D) of any time bin of the input image, with label values in a fixed color overlay superposed. To help him further, he can click on any slice and see the different time bins with VP/S superposed, as well as phase and amplitude image. Based on his inspection, he can change or suppress the label of any segment by a click on the selected 4D-segment. He can also re-segment a particular segment. This can be done for example by applying the segmentation algorithm to the unfiltered version of the image region defined by that segment. Another possibility would be to use the Cavity Detector (ref. IPMI) or any other segmentation algorithm to the region covered by the segment to re-segment. The user can also decide to re-label the cavities in 3D, in a semi-automatic labeling: for two orthogonal planes whose orientation, section and time bin are chosen as a function of the cavity to be labeled, the screen displays, after that the user has defined roughly the longitudinal and transversal axes of the heart, the intensity, power and phase (or the corresponding parameters of the matched filters, or in place of the power, the slope parameter). In each of these 2 orthogonal planes, the user defines polygons corresponding to the selected cavity.

Finally, he can inspect the three rotation angles to bring the heart in standardized position by viewing any time bin rotating gradually from the original to the standardized position. He can then correct any of the three angles if necessary.

In the case of any user correction, the program erases its automatic quantification results, so that the user has to restart the automatic processing, which resumes from the first point in the global flow chart where manual corrections were applied. Again, this can be done interactively (for example while inspecting the next automatically processed patient) or in batch mode (for example after all the automatically processed patients have been inspected). A major exception is in case of modification of the labeling of a segment or a part of it: the user have just to go further with the processing, the stage 17 being foreseen to proceed immediately to the final results.

In study implicating 5D or more, the user can switch between either viewing successive time bins, or viewing successive (for example stress-) bins.

Stage 17: Determination of the Segmental Movement:

This stage is identical to stage 15. The program nevertheless re-compute the septum thickness, the curves and the segmental movements of the ventricular walls if the operator has changed the labeling of a segment of a part of it. Redoing this step immediately spares time to the user and so increases the feeling of "user friendly" of the method.

Stage 18: Two-dimensional Representations:

For both left ventricle LV and right ventricle RV, the program computes one or more of the following bullseyes (preferably all said bullseyes), corresponding to:

the amplitude of the excursion of the cardiac wall;
the phase;
the power;
the slope;
the systolic slope;

the diastolic slope;

the volume of the bullseye "pixel".

The flow chart for both LV and RV bullseyes are identical. The only difference is in the transformation from 3D-space (x, y, z coordinates) to 2D bullseye (i, j coordinates). Both are illustrated in the joint figure.

The program uses an known bullseye transformation # for the LV. In the bullseye plane, the i coordinate is the radius, and the j coordinate is the phase, with 0 angle pointing to the bottom. In the 3D space, the i coordinate follows the long axis of the LV from apex to base, and the j coordinate is the phase in the plane perpendicular to the i coordinate, with 0 angle pointing to the base of the heart.

Here it can be seen how practical the standardized position is: the j coordinate is just a scaling of the y coordinate, and the j coordinate is the angle of the (z, x) point with respect to the center of gravity COG(LV) in the corresponding slice.

The right ventricle RV can be described as a bent tube leaning against the LV. Since the input and output valves are not aligned as in the case of the left ventricle LV, and they can be somewhat separated, following the same transform as for the LV bullseye might result in cutting the RV wall twice along one (i, j) ray in the 3D space. Hence, the program defines the RV as a tube, and the i coordinate follows this tube rotationally, the rotation center being the point between input and output valves. The program takes as assumption that this point is at $(z_{COG(RV)}, y_{base(RV)})$. The axis of rotation for the i parameter is parallel to the x-axis. The starting end stopping angles are chosen at respectively 18° and 150° so as to reflect the theoretical angle between input and output valves of the RV. The j parameter is then defined in this plane and not in the (x, z)-plane and is chosen so that, placed side by side (as in the figure), the septum of both ventricles are facing each other. An alternative would be to section the ventricle by planes which all pass through its centroid at equidistant angles.

The mathematical formulation of the transformation from 3D (x, y, z) space to 2D (i, j) bullseye plane are as follows: for the left ventricle:

$$i = NSA*(y - y_{apex})/(y_{base} - y_{apex})$$

$$j = (NPSA/2\pi)* \arctan((x - x_{cog,i})/(z - z_{cog,i}))$$

whereby $y_{apex}$ is the y position (along the axis Y) of the apex of the LV;

$y_{base}$ is the y position of the base of the LV;

$x_{cog,i}$ and $z_{cog,i}$ are respectively the x and z positions of the center of gravity of the LV in the i-plane;

NSA is the number of concentric circles in the bullseye;

NPSA is the number of sectors in the bullseye.

For the right ventricle:

$$\theta = \arctan((y_{base} - y)/(z - z_{cog}))$$

$$i = NSA*(\theta - \theta_0)/(\theta_e - \theta_0)$$

$$r = \sqrt{(y_{base} - y)^2 + (z - z_{cog})^2}$$

$$j = (NPSA/2\pi)*\arctan((x - x_{cog,i})/(r - r_{cog,i}))$$

whereby x,y,z are the position of the pixel considered along three perpendicular axis;

$y_{base}$ is the y position of the base;

$\theta_0, \theta_e$ are the start- and stop angle over which i rotates (for example 18° and 150°);

$z_{cog}$ is the global center of gravity of the RV; $x_{cog,i}$, $r_{cog,i}$ are respectively the x and r positions of the center of gravity of the RV in the i-plane;

NSA is the number of concentric circles in the bullseye;

NPSA is the number of sectors in the bullseye.

In the bullseye view of the Right ventricle, the inner concentric circles corresponds to the valve V1, while the outer circle corresponds to the valve V2. The radius i is correlated with the angle of the plane cutting the right ventricle in which the considered is located, while j is the angular position of the segment considered in the substantially circular cutting of the right ventricle peel with the plane defined by the angle i.

An alternative to the LV bullseye calculation which would take into account the possibly bent shape of the LV would be to take the i coordinate along the skeleton of the LV (going from apex to base-long axis), and defining the j coordinate in the plane ZX perpendicular to the skeleton. The different bullseye values should represent the value of the visualized parameter at the wall of the heart and not all along the (i, j) ray in the (x, y, z) space. In practice, an average value is calculated in a trapezoidal pixel region defined by ([i−1, i−2, i+1, i+2],[j−1,j−2, j+1,j+2], [border of segments, border of segment −α], Δ defining a kind of "peel" at the border of the cavity. In practice, Δ is taken for example to be 2 pixels of 2.54 mm. To be able to take into account this "peel", the program apply a distance transform on the LV/RV region (REGIM), and we will only take into account pixels with this distance transform lower or equal to Δ.

To be sure there is no cut in the cavity during rotation to standardized position, the program will rotate around the COG of the examined cavity, COG being defined on the basis of the LV/RV region.

The slope bullseye compares (regionally, pixel-wise, via linear regression) the time evolution of the gray value of a pixel with the average time evolution of the pixels belonging to the current cavity and having and amplitude higher than a certain threshold. A global slope takes into account all time bins; a systolic slope takes only into account the time bins between ED and ES, and a diastolic slope the time bins between ES and ED. Only if the correlation coefficient ρ is positive do we take the resulting slope parameter into account; in case ρ<−0.9 the slope is termed "paradoxical", and in case −0.9<ρ<0 the slope is termed "NOP". During averaging to step from (x, y, z) space to (i, j) plane, NOP pixels are not taken into account (neutral element), while one paradoxical (x, y, z) pixel fixes the (i, j) pixel also to paradoxical (absorbing element).

The program gives then 6 matrices corresponding to 6 3D images,

REGIM(maximal movement of the peel), PHASE(phase activity at the peel of the ventricle), POWER (amplitude of activity at the peel of the ventricle), SLOPEIM (??)S_SLOPE (systolic slope activity at the peel of the ventricle), and D_SLOPE (diastolic slope activity at the peel of the ventricle). Each is rotated around the COG of the cavity considered to bring them in standardized positions.

The program needs to determine four parameters to perform the bullseye transform: $y_{apex}$, $y_{base}$, $x_{COG}$ and $z_{COG}/r_{COG}$. On the basis of REGIM in standardized position, the program defines the center for the j coordinate in the (x, z) plane (for LV) or (x, r) plane (for RV) for each value of i: this is $COG_{LV}(i)$ and $COG_{RV}(i)$. The apex is defined as the lowest value of y for which there are still LV/RV pixels in the corresponding (x, z) plane, plus two. For the base, the program computes the maximum slope in the (x, z) plane corresponding to each y where LV/RV is defined. This curve is smoothed. The program starts from the highest value for y for which there are still LV/RV pixels in the corresponding (x, z) plane, and then decreases this value until the corresponding value of the smoothed curve is higher than a threshold. This precaution ensures that program is indeed in the LV/RV region, and not at the level of the valves.

The next step is logically to perform the bullseye transformation for each of the 6 images, and to compute the average over ([i–½, i+½[,[j–½, j+½[, [border of segments, border of segment –Δ[). If any (i, j) pixel was not defined with the forward transform ((x, y, z)→(i, j), which has the advantage of allowing averaging)), the program uses the inverse transform to go and find at least one (x, y, z) pixel corresponding to the concerned (i, j) pixel.

To compute the volume bullseye, the program just counts the number of (x, y, z) pixels used to compute each (i, j) pixel.

For the movement bullseye, the program does not calculate an average value, but the maximum of REGIM along the i, j ray (or ([i–½, i+½[,[j–½, j+½[, [border of segments, 0[) volume) for which SLOPEIM is neither paradoxical nor NOP (?) and is higher than a threshold (this defines the highest excursion of the heart wall in that volume).

In case of study involving 5 dimensions or more, the 6 bullseyes have to be computed for each of the—for example stress-bins. Then, the stress-evolution of each bullseye pixel is examined compared with the stress-evolution of the average for the current cavity via a linear regression. Pixels for witch the correlation ratio is high and the slope is strong are marked as pathologic. When examining the bullseyes, the user views the bullseye of the first stress-bin combined with an indication of which regions are possibly pathological. If he wants to examine the Bullseye in more detail, he can click on the bullseye display and switch between the different stress-bins, the correlation factor and the slope.

Figure 3:
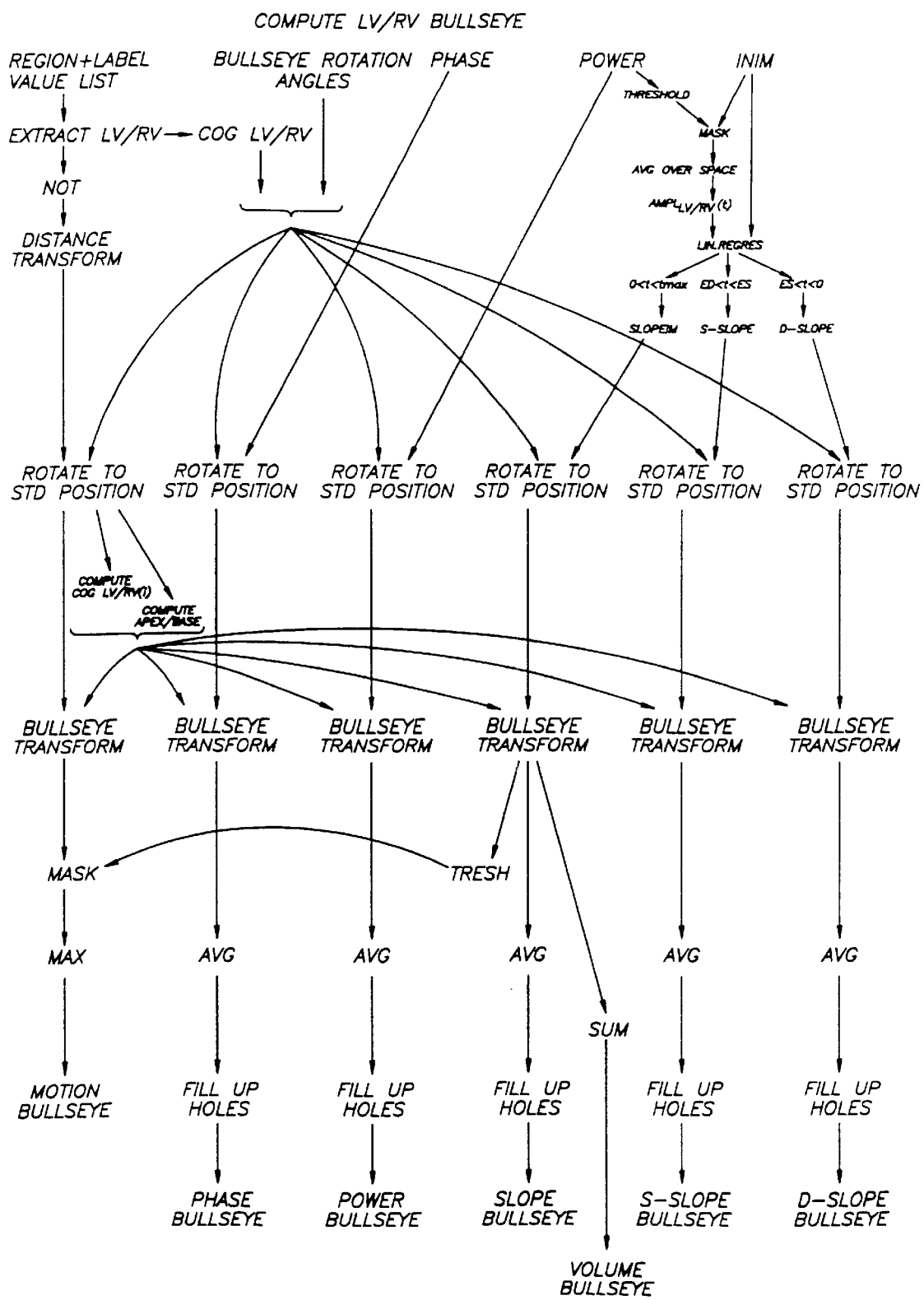
FIG. 3 is another flow chart of a computer process of the invention.
Figure 6:
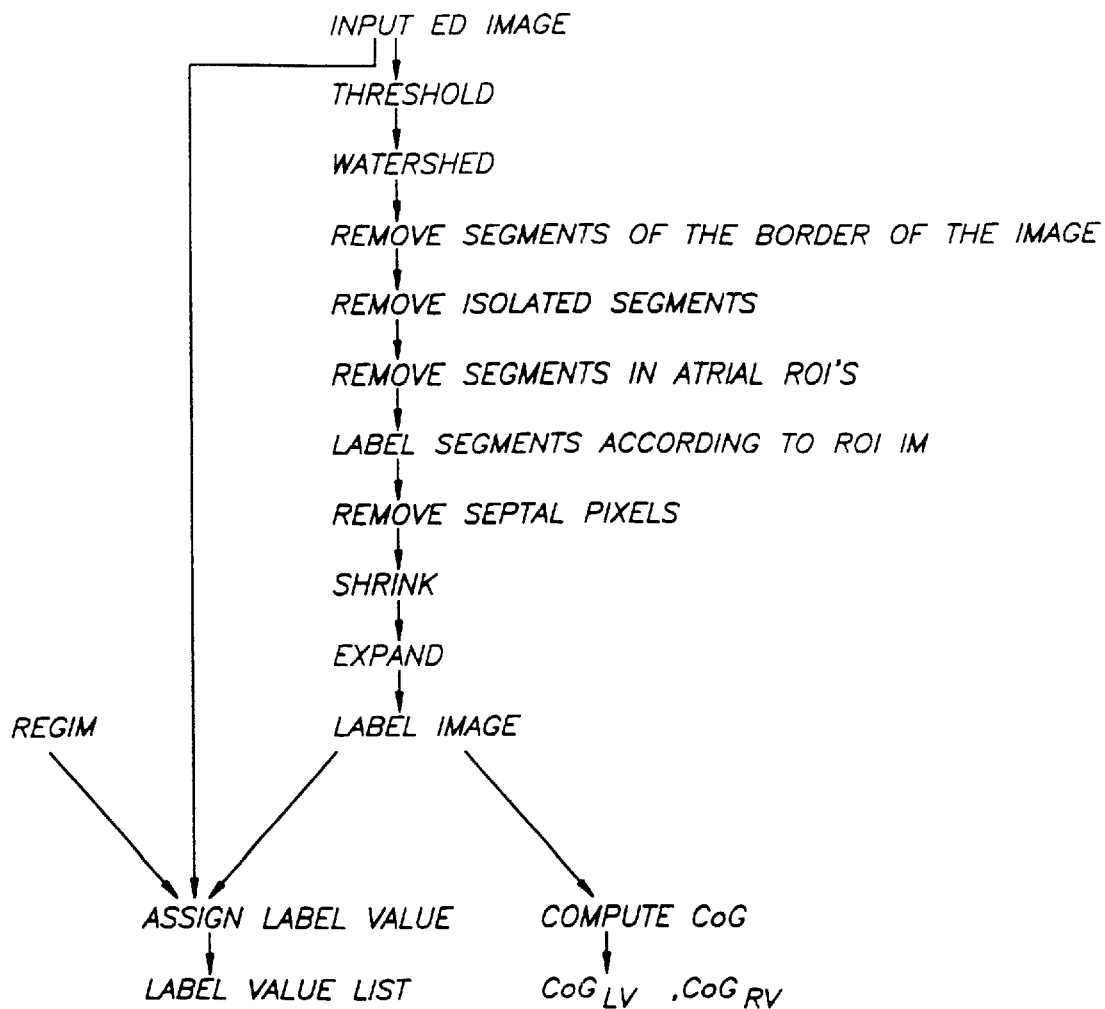
FIGS. 6 to 10 are other flow charts of part of the program of the invention.
Figure 7:
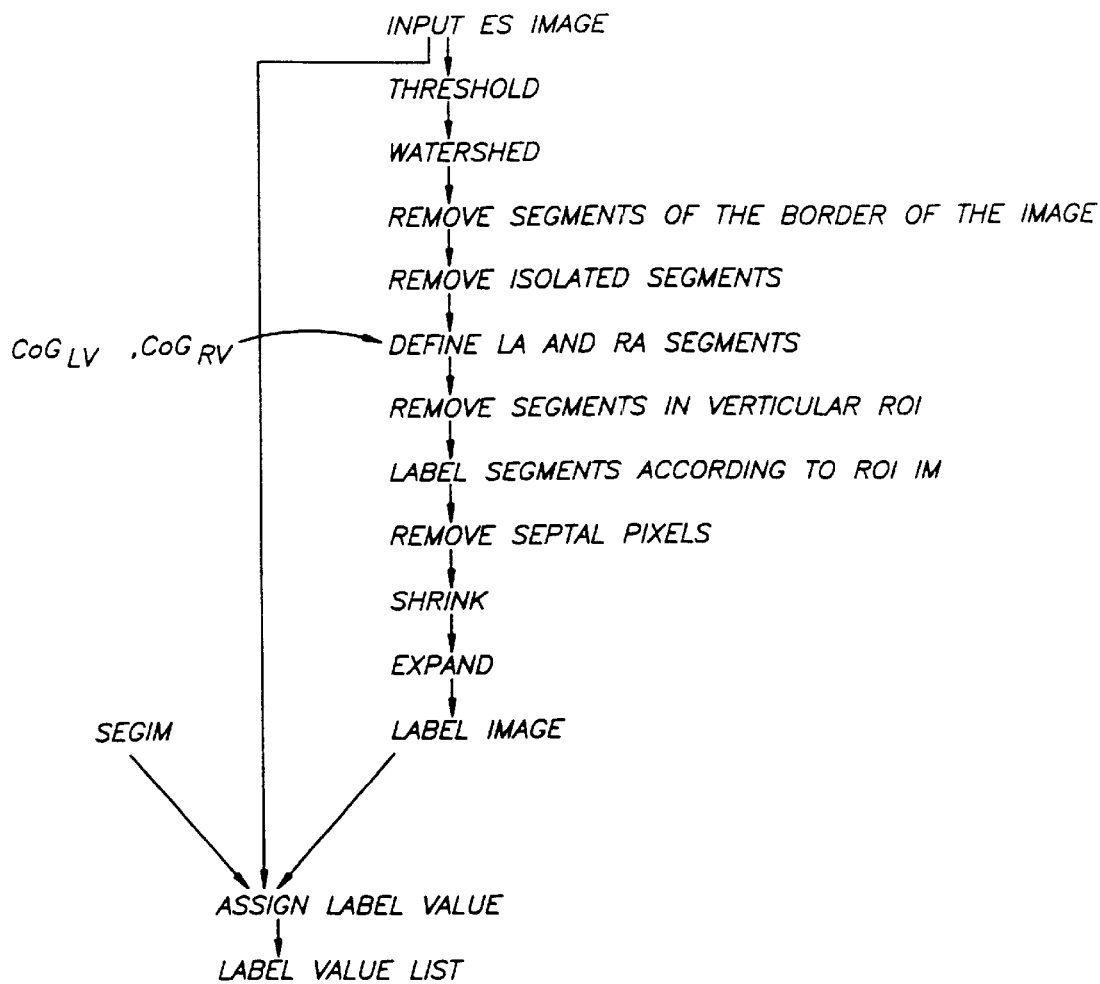
Figure 8:
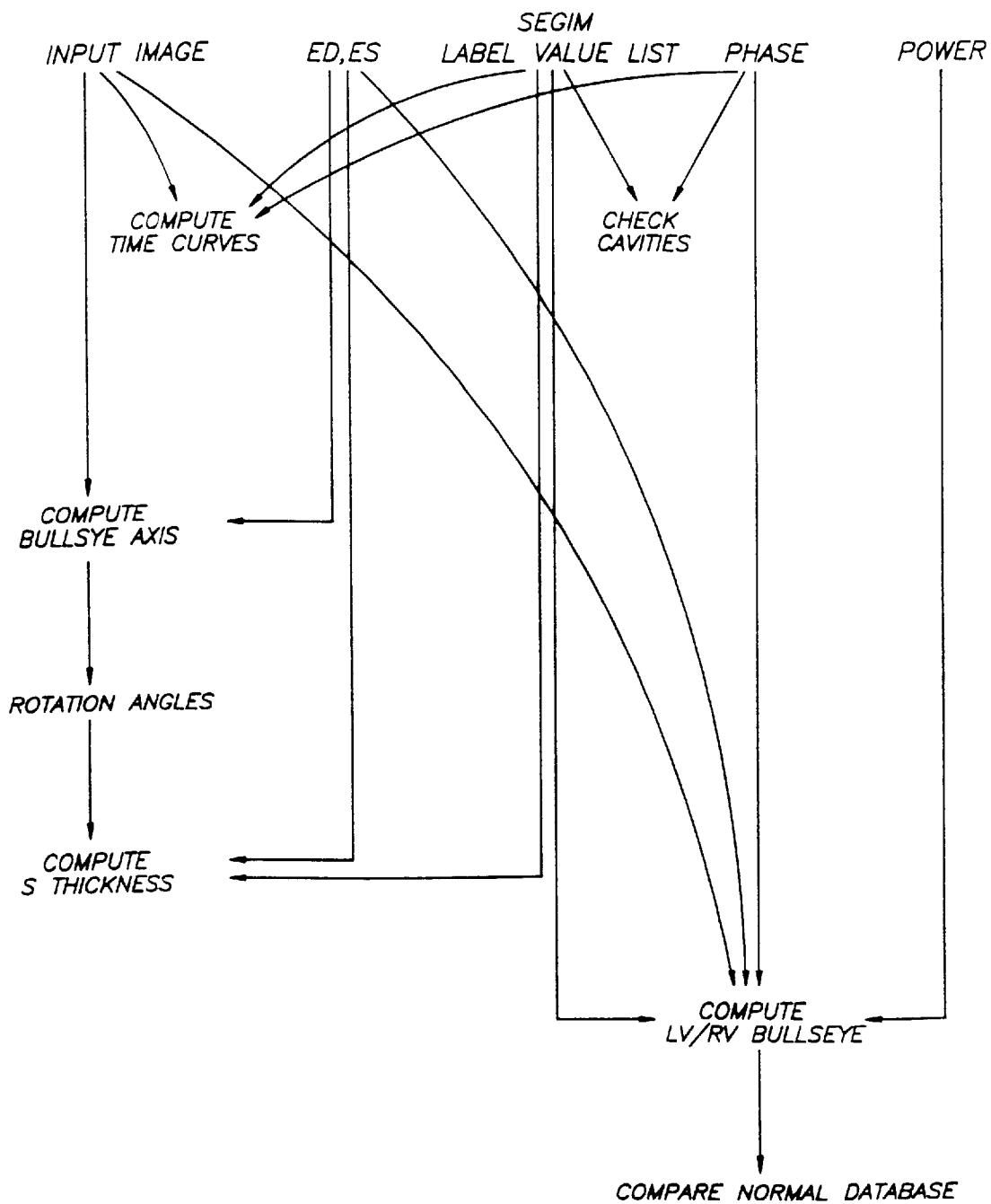
Figure 9:
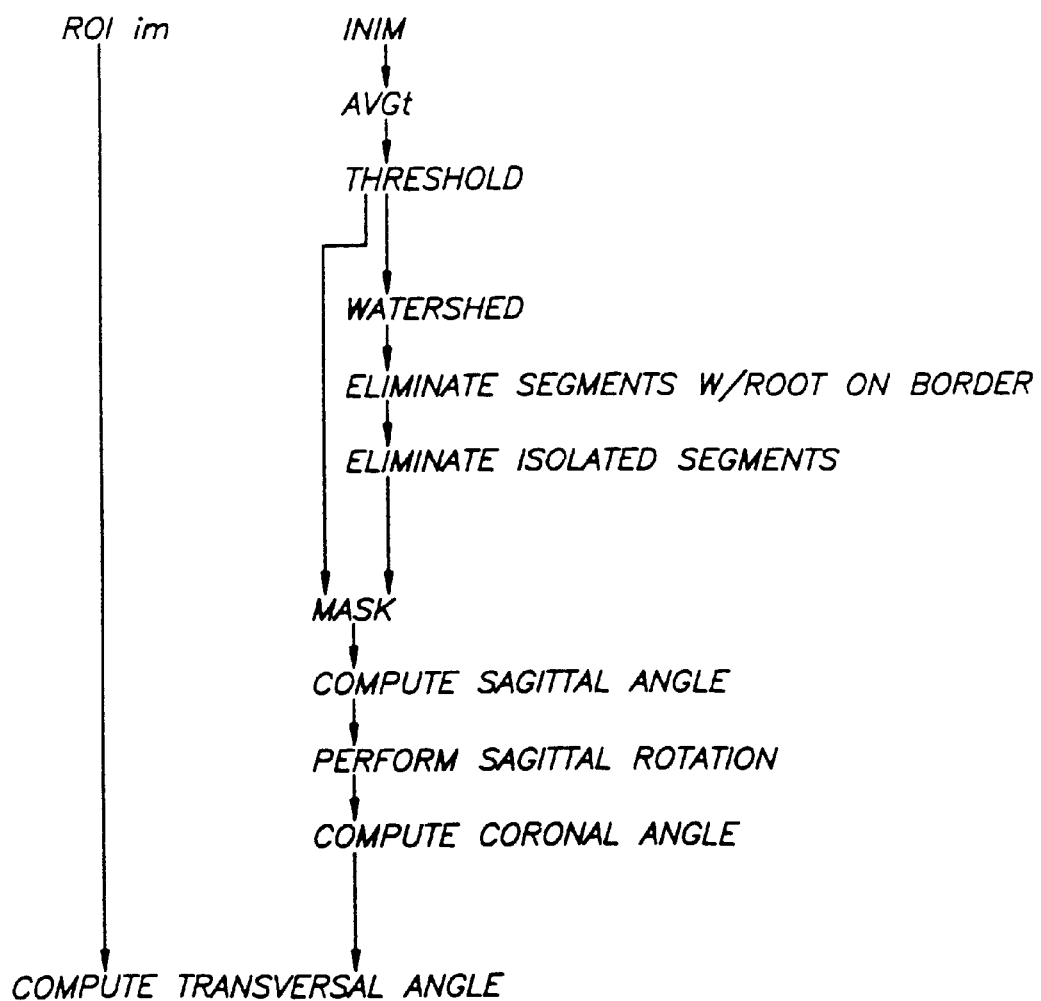
Figure 10:
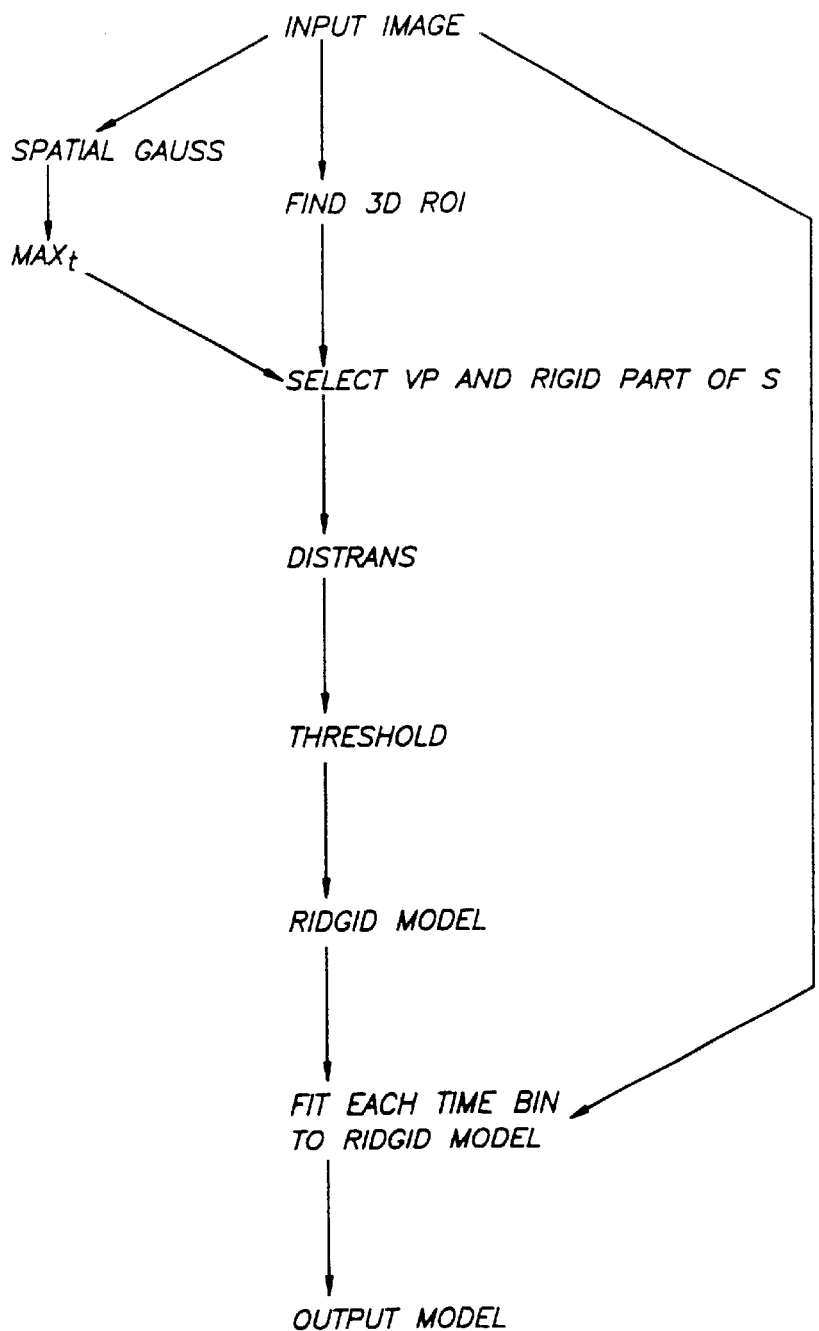

Some specific bullseyes will now be disclosed with more details. (see FIG. 3)

From the segmented matrix (stage 9) and from the labels of stages 11 and 13, the segment corresponding to LV and RV are extracted. The program calculates for said ventricles their center of gravity (COG LV and RV).

For computing the rotation necessary for directing the heart image in its standardized position, the program first computes a representative 3D image (in the preferential implementation, the 3D-image of the average activity of the input image over time), then discard the pixels of the resulting image having an activity lower than a threshold. Then, the program applies a 3D watershed (preferably to an edgmentation algorithm) on the gray value image so as to obtain a 3D-segmented image. Finally the border segments and isolated segments are eliminated. The result is used as a mask on the thresholded gray value image. The program determines a sagittal rotation angle (rotation in the y, z-plane) as the angle (preferably between –88° and 0°) which maximizes the sum of gray values in the top right half of any slice, and a coronal rotation angle (rotation in the x, z-plane) as the angle (in the preferential embodiment between –30° and +30°) with the same criterion (maximizing the sum of gray values in the top right half of any slice). An alternative would be to compute the two angles according to planar regression analysis of the VP as defined previously. Finally, the program determines the transversal rotation angle (rotation in the x, y-plane) as 90° —the angle of the Septum, said angle of the septum being defined by linear regression analysis in the x, y-plane of the Septal ROI.

In case of study in more than 4D, for example with the addition of stress as the $5^{th}$ dimension, the computing of the standardized position has to be done on each individual stress-bin, due to the possible variation of the position of the heart inside the chest for different levels of stress.

The program defines in this way the bullseyes rotation angles with respect to the center of gravity of the left ventricle (or right ventricle) necessary for putting the heart in the standard position.

A distance transform is applied to the segments of the ventricles, so as to take only into consideration pixel within a distance of 1 or 2 pixel of the edges of the segments. The image of said ventricle peels is given in a matrix REGIM.

The program executes a rotation around the COG LV(or RV) of the matrix REGIM, the rotation being defined by the bullseyes rotation angles for reaching the standard position.

From said standard position, the program determines four parameters to perform the bullseye transform: $y_{apex}$, $y_{base}$, $x_{COG}$ and $z_{COG}/r_{COG}$. On the basis of REGIM in standardized position, the program defines the center for the j coordinate in the (x, z) plane (for LV) or (x, r) plane (for RV) for each value of i: this is $COG_{LV}(i)$ and $COG_{RV}(i)$. The apex is defined as the lowest value of y for which there are still LV/RV pixels in the corresponding (x, z) plane, plus two. For the base, the program computes the maximum slope in the (x, z) plane corresponding to each y where LV/RV is defined. This curve is smoothed. The program starts from the highest value for y for which there are still LV/RV pixels in the corresponding (x, z) plane, and then decreases this value until the corresponding value of the smoothed curve is higher than a threshold. This precaution ensures that program is indeed in the LV/RV region, and not at the level of the valves.

The definition of these parameters $y_{apex}$, $y_{base}$, $x_{COG}$ and $z_{COG}/r_{COG}$ by the program, will be further be used for applying the bullseyes transform on the Left ventricle and/or the right ventricle, for the matrix REGIM after rotation to the standard position, for the matrix PHASEIM after rotation to the standard position, for the matrix POWERIM after rotation to the standard position.

The input image or matrix (stage 8) is treated by the program for determining activity slope. To the POWERIM matrix, the program applies a threshold filtration for determining the pixels having an amplitude of activity variation of more than 50% of the maximum amplitude of activity of POWERIM. A mask (pixels with an amplitude activity of more than 50% of the maximum amplitude) is then defined by the program and is applied to the INPUT IMAGE for conserving in said matrix only the pixels of the mask. The average of activity is calculated for the pixels of the masked Input image and the amplitude of the activity variation for the pixels over the time is calculated for the LV and RV. This gives a slope of the average activity of the pixels during the heart cycle (time bin per time bin for the ventricle portions), or the activity evolution of a pixel considered as normal during the systolic movement (S-SLOPE) (time bin increasing from ED to ES—contraction phase of the ventricles) and during the diastolic movement (D-slope) (time bin increasing from ES to ED).

From the input image and from the determination of the ED time bin and ES time bin, the program determines, via a linear regression, the slope of the activity during the systolic movement (S-SLOPE) (time bin increasing from ED to ES—contraction phase of the ventricles) and during the diastolic movement (D-slope) (time bin increasing from ES to ED). Said slopes are determined for each pixels taken into consideration, whereby matrixes are defined.

By comparing the slope of the normal pixel and the slope of the activity of the pixel of the INPUT IMAGE (pixel by pixel), the program determines pixels of the INPUT IMAGE for which a problem exist. Said determination can be carried out by the program by correlating the amplitude of activity of each pixel of the INPUT IMAGE with the amplitude of movement of the average activity. The program determines then, by linear regression, the slope of this correlation, and determines the pixel for which the slope is equal to about 1 and or greater than 0 (normal pixel), pixel for which the slope is equal to −1 and or lower to −0.9 (paradoxical pixel), and possibly other pixels, for example pixels for which there is no correlation or pixels with a slope between −0.9 and 0 (not taken into consideration for the analysis).

All the slope of said correlation are given in a matrix SLOPEIM.

The program executes a rotation on the slopeim matrix for putting the matrix in the standard position and determines from the peel portion of the standardized slopeim matrix an average slope, average determined by calculating in a trapezoidal pixel region defined by ([i−1, i−2, i+1, i+2],[j−1, j−2, j+1, j+2],[(border of segments, border of segment −Δ]), A defining a kind of "peel" at the border of the cavity. In practice, Δ is taken for example to be 2 pixels of 2.54 mm.

If any (i, j) pixel was not defined with the forward transform ((x, y, z)→(i, j), which has the advantage of allowing averaging)), the program uses the inverse transform to go and find at least one (x, y, z) pixel corresponding to the concerned (i, j) pixel. This step is called "fill up holes".

The slope bullseyes is then shown for the LV and RV.

On the matrix obtained after the bullseyes transform, the program executes a threshold for conserving all the pixels with a correlation slope of at least 0.5. The program defines in this way a mask.

Said mask is used by the program for calculating for the pixels of the mask of the matrix standardized regim after bullseyes transformation, the maximum variation of activity for the peel, whereby the program defines a movement (amplitude) bullseye.

From the slopeim matrix in the standardized position the program calculates for the pixels of the LV and for the pixels of the RV, the sum of the slope coefficient for the peel portion, so as to determine a volume. The program then gives a volume bullseye.

The powerim matrix is treated by the program for putting the matrix in the standard position and for determining for the peel portion an average of amplitude, average determined by calculating in a trapezoidal pixel region defined by ([i−1, i−2, i+1, i+2],[j−1, j−2, j+1, j+2], [border of segments, border of segment −Δ]), Δ defining a kind of "peel" at the border of the cavity. In practice, A is taken for example to be 2 pixels of 2.54 mm.

If any (i, j) pixel was not defined with the forward transform ((x, y, z)→(i, j), which has the advantage of allowing averaging)), the program uses the inverse transform to go and find at least one (x, y, z) pixel corresponding to the concerned (i, j) pixel. This step is called "fill up holes".

The power bullseye is then shown for the LV and RV.

The phaseim matrix is treated by the program for putting the matrix in the standard position and for determining for the peel portion an average of the phase, average determined by calculating in a trapezoidal pixel region defined by ([i−1, i−2, i+1, i+2],[j−1, j−2, j+1, j+2], [border of segments, border of segment −Δ]), A defining a kind of "peel" at the border of the cavity. In practice, A is taken for example to be 2 pixels of 2.54 mm.

if any (i, j) pixel was not defined with the forward transform ((x, y, z)→(i, j), which has the advantage of allowing averaging)), the program uses the inverse transform to go and find at least one (x, y, z) pixel corresponding to the concerned (i, j) pixel. This step is called "fill up holes".

The phase bullseye is then shown for the LV and RV.

The S-slope image or matrix is treated by the program for putting the matrix in the standard position and for determining for the peel portion an average of systolic slope, average determined by calculating in a trapezoidal pixel region defined by ([i−1, i−2, i+1, i+2], [j−1,j−2, j+1, j+2], [border of segments, border of segment −Δ), Δ defining a kind of "peel" at the border of the cavity. In practice, Δ is taken for example to be 2 pixels of 2.54 mm.

If any (i, j) pixel was not defined with the forward transform ((x, y, z)→(i, j), which has the advantage of allowing averaging)), the program uses the inverse transform to go and find at least one (x, y, z) pixel corresponding to the concerned (i, j) pixel. This step is called "fill up holes".

The S-slope bullseye is then shown for the LV and RV.

The D-slope image or matrix is treated by the program for putting the matrix in the standard position and for determining for the peel portion an average of amplitude, average determined by calculating in a trapezoidal pixel region defined by ([i−1, i−2, i+1, i+2], [j−1,j−2, j+1, j+2], [border of segments, border of segment −Δ]), Δ defining a kind of "peel" at the border of the cavity. In practice, A is taken for example to be 2 pixels of 2.54 mm.

If any (i, j) pixel was not defined with the forward transform ((x, y, z)→(i, j), which has the advantage of allowing averaging)), the program uses the inverse transform to go and find at least one (x, y, z) pixel corresponding to the concerned (i, j) pixel. This step is called "fill up holes".

The D-slope bullseye is then shown for the LV and RV.

Stage 19: Display of the Results:

All the bullseyes displayed as raw data as well as by comparison with a normal database.

On the bullseyes are drawn the theoretical arterial territories of the ventricles. The parameters extracted from the generated data are expressed per arterial territories or part of them (inside the territory of the left coronarial artery, apex and septum are distinguished) and as well as raw data as by comparison with the databases (expressing the size and the severity of the pathology). The motions are expressed also in absolute values (mm), from the amount of pixels implicated in the motion crossed by the pixel size.

Various other parameters are extracted, including the ejection fraction, the end-diastolic, end-systolic and stroke volumes of each of the 4 cavities, different diastolic and systolic parameters including peak filling rate, peak emptying rate, their normalised ratio by the heart rate, the ratio of the stroke volumes of the ventricles, . . . A special attention was carried on the variation coefficient, per cavity and specially on the left ventricle, of the value of the phase parameter of the voxels not identified as pathological by the comparison with the phase database as well as all the voxels of the cavity.

The program disclosed hereabove can be adapted for a five Dimensional analysis, i.e. for taking into consideration a further parameter for example a variable effort.

In said program, the following modification will be done:

In stage 2, the normalisation of the activity should be carried out for each period considered of the variable effort. A further normalisation of the activity will be carried out for taking into account the isotope decay due to the time between two effort periods for which a tomograph image is taken.

For example, the decay normalisation will increase the pixel activity measured for the effort periods subsequent to the first period taken into consideration.

The stage 4 (correction of the VP movement) will be done separately for each effort period. The rigid model will advantageously be determined by using the data of the first effort period.

An additional filtering step will advantageously be added for filtering the fifth dimension parameter.

The segmentation step (stage 9) can be extended by using a supplemental effort space ratio.

For the quantitification the FFT analysis will advantageously be carried out separately for each effort period, as well as for bin of different effort periods.

The program as described hereabove can be processed in a computing system, for enabling the treatment of data of the synchronized electrocardiogram tomography. Possibly the tomograph can be provided with a computing system for processing the computing process described hereabove or part thereof. The computing system and tomograph are then provided with means for executing one or more computing steps of the computer program disclosed hereabove.

What we claim is:

1. A computer program storage medium readable by a computing system and encoding a computer program of instructions for executing a computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:
    reading data obtained from the synchronized electrocardiogram tomoscintigraphy corresponding to 3dimensional images at different time bins, said images being defined by pixels;
    normalizing the activity at each time bin;
    determining a rigid model comprising a reference;
    determining, for each time bin, the correction movement for matching the reference and correcting fot this in each time bin;
    determining the time bins for end-systole and end-diastole;
    determining the phase and amplitude of pixels of the 3dimensional images;
    filtering temporally and spatially
    substracting the background
    segmenting the images;
    temporal and spatial filtering;
    labeling the ventricles and the auricles
    computing at least a parameter selected from the group consisting of activity curves, thickness of at least a portion of the septum, ventricular movements;
    determining of 2D representations ofsegmenrtal motion, and
    displaying results.

2. The program of claim 1, in which the data read are 3dimentional images at different time bins for at least two different physical states.

3. A computer program storage medium readable by a computing system and encoding a computer program of instructions for executing a computer process for the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:
    reading data obtained from the synchronized electrocardiogram tomographic imaging corresponding to 3dimensional images at different time bins, said images being defined by pixels;
    determining from data obtained from the synchronized electrocardiogram tomographic imaging a reference position of a first portion of the heart selected from the group consisting of the valvular plane, at least a portion of the septum and the valvular plane with at least a portion of the septum;
    determining from said data obtained from the synchronized electrocardiogram tomographic imaging a position of the the first portion of the heart at each time bin;
    for each time bin, determining a movement for matching the first portion at the considered time bin with the reference position of the first portion;
    using the determined movement for correcting the 3dimensional images at the different time bins, and
    using the corrected 3dimensional images for determining an accurate localisation an of the heart.

4. The computer program storage medium of claim 3, in which the computer process comprises the steps of:
    determining from data obtained from the synchronized electrocardiogram tomographic imaging a reference position of the valvular plane;
    determining from said data obtained from the synchronized electrocardiogram tomographic imaging a position of the valvular plane at each time bin, and
    for each time bin, determining a movement for matching the valvular plane at the considered time bin with the reference position of the valvular plane.

5. The computer program storage medium of claim 3, in which the computer process comprises the steps of:
    determining from data obtained from the synchronized electrocardiogram tomographic imaging a reference position of the valvular plane and at least a portion of the septum;
    determining from said data obtained from the synchronized electrocardiogram tomographic imaging a position of the valvular plane and at least a portion of the septum at each time bin, and
    for each time bin, determining a movement for matching the valvular plane and at least a portion of the septum at the considered time bin with the reference position of the valvular plane and septum.

6. The computer program storage medium of claim 3, in which the computer process comprises the steps of:
    determining from data obtained from the synchronized electrocardiogram tomographic imaging a reference position of at least a portion of the septum;
    determining from said data obtained from the synchronized electrocardiogram tomographic imaging a position of at least a portion of the septum at each time bin, and for each time bin, determining a movement for matching at least a portion of the septum at the considered time bin with the reference position of at least a portion of the septum.

7. A computer program storage medium readable by a computing system and encoding a computer program of instructions for executing a computer process for the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomographic imaging corresponding to 3dimensional images at different time bins, said images being defined by pixels;

determining from data obtained from the synchronized electrocardiogram tomographic imaging a position of a portion of the heart selected from the group consisting of the valvular plane, at least a portion of the septum and the valvular plane with at least a portion of the septum;

labeling in the image from said position at least a region of interest selected from the group consisting of left ventricle, right ventricle, left auricle, right auricle, ventricles, auricles, left auricle and left ventricle, right auricle and right ventricle.

8. The computer program storage medium of claim 7, in which said computer process comprises at least the steps of:

reading data obtained from the synchronized electrocardiogram tomographic imaging corresponding to 3dimensional images at different time bins, said images being defined by pixels;

determining from data obtained from the synchronized electrocardiogram tomographic imaging, at each time bin, a position of a portion of the heart selected from the group consisting of the valvular plane, at least a portion of the septum and the valvular plane with at least a portion of the septum;

labeling in the image at each time bin, from said position at least a region of interest selected from the group consisting of left ventricle, right ventricle, left auricle, right auricle, ventricles, auricles, left auricle and left ventricle, right auricle and right ventricle.

9. The computer program storage medium of claim 7, in which said computer process comprises at least the steps of:

determining from data obtained from the synchronized electrocardiogram tomographic imaging, a position of the valvular plane with at least a portion of the septum;

labeling in the image, at least a region of interest selected from the group consisting of left ventricle, right ventricle, left auricle, right auricle.

10. The computer program storage medium of claim 7, in which said computer process comprises at least the steps of:

determining from data obtained from the synchronized electrocardiogram tomographic imaging a position of the valvular plane with at least a portion of the septum;

labeling in the image, from said position, at least two regions of interest selected from the group consisting of left ventricle, right ventricle, left auricle, right auricle.

11. The computer program storage medium of claim 7, in which said computer process further comprises the steps of:

determining from data obtained from the synchronized electrocardiogram tomographic imaging a reference position of a first portion of the heart selected from the group consisting of the valvular plane, at least a portion of the septum and the valvular plane with at least a portion of the septum;

determining from said data obtained from the synchronized electrocardiogram tomographic imaging a position of the the first portion of the heart at each time bin;

for each time bin, determining a movement for matching the first portion at the considered time bin with the reference position of the first portion;

using the determined movement for correcting the 3dimensional images at the different time bins, and using the corrected 3dimensional images for determining an accurate localisation of the heart.

12. The computer program storage medium of claim 7, in which the computer process comprises the steps of:

determining from data obtained from the synchronized electrocardiogram tomographic imaging a reference position of the valvular plane;

determining from said data obtained from the synchronized electrocardiogram tomographic imaging a position of the valvular plane at each time bin, and for each time bin, determining a movement for matching the valvular plane at the considered time bin with the reference position of the valvular plane.

13. The computer program storage medium of claim 7, in which the computer process comprises the steps of:

determining from data obtained from the synchronized electrocardiogram tomographic imaging a reference position of the valvular plane and at least a portion of the septum;

determining from said data obtained from the synchronized electrocardiogram tomographic imaging a position of the valvular plane and at least a portion of the septum at each time bin, and for each time bin, determining a movement for matching the valvular plane and at least a portion of the septum at the considered time bin with the reference position of the valvular plane and septum.

14. The computer program storage medium of claim 7, in which the computer process comprises the steps of:

determining from data obtained from the synchronized electrocardiogram tomographic imaging a reference position of at least a portion of the septum;

determining from said data obtained from the synchronized electrocardiogram tomographic imaging a position of the septum at each time bin, and for each time bin, determining a movement for matching at least a portion of the septum at the considered time bin with the reference position of the septum.

15. A computer program storage medium readable by a computing system and encoding a computer program of instructions for executing a computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomoscintigraphy corresponding to 3dimensional images at different time bins, said images being defined by pixels;

determining and labeling from data obtained from the synchronized electrocardiogram tomoscintigraphy at least a segment corresponding to at least a part of an organ selected from the group consisting of aorta descendens, spleen, liver, valvular plane, the septum, ventricle, auricle.

16. The computer program storage medium of claim 15, in which the computer process comprises the steps of:

labelling in the image a region corresponding to the Aorta descendens;

labeling in the image a region corresponding to the spleen;

labelling in the image a region corresponding to the valvular plane and a region correponding to the septum;

from said labeled regions of the valvular plane and septum, determining and labeling in the image regions corresponding to the ventricles and the auricles.

17. A computer program storage medium readable by a computing system and encoding a computer program of instructions for executing a computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram is tomoscintigraphy corresponding to 3dimensional images at different time bins, said images being defined by pixels;

determining pixels defining at least a part of a wall of a region of interest of the heart;

determining for said part an average activity at each time bin, determining for said part for at least a part of the heart cycle, an average slope of activity in function of time bins;

determining for each pixel of the part considered and for the portion of heart cycle considered, an actual slope of activity in function of time bins, and determining a status parameter of pixels defining the part considered, by comparison for the pixel considered, the actual slope of activity with the average slope.

18. A computer program storage medium readable by a computing system and encoding a computer program of instructions for executing a computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomoscintigraphy corresponding to 3dimensional images at different time bins, said images being defined by pixels;

determining pixels defining at least a part of a wall of a region of interest of the heart;

determining for said part an average activity at each time bin, determining for said part for at least a part of the heart cycle, an average slope of activity in function of time bins;

determining a correlation, time bin per time bin, for the pixels of the part considered, between the actual activity and the average activity of the part considered, and determining, from the correlation, a status parameter of pixels defining the part considered.

19. The computer program storage medium of claim 18, in which the computer process determines a correlation, during the heart cycle, for the pixels of the part considered, between the actual activity and the average activity of the part considered.

20. A computer program storage medium readable by a computing system and encoding a computer program of instructions for executing a computer process for the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomographic imaging corresponding to 3dimensional images at different time bins, said images being defined by pixels;

determining pixels defining at least a part of the peel of the right ventricles, said ventricle having the general shape of a tube with a point of cuvature extending between two valves;

determining a 3dimensional parameter for the pixels considered;

using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered.

21. The computer program storage medium of claim 20, in which the transform defines each pixel by parameters characterizing the position of the pixel considered in a plane passing through said pixel and through a base defined between the first and second valves.

22. The computer program storage medium of claim 20, in which the position of each pixel of the peel of the right ventricle is defined by the parameters i and j, said parameter being determined by the following formulas:

$$\theta = \text{arc tangent } ((y_{base}-y)/(z-z_{cog}))$$

$$i = NSA * (\theta-\theta_0)/(\theta_e-\theta_0)$$

$$r=\text{sqrt}((y_{base}-y)^2+(z-z_{cog})^2)$$

$$j=(NPSA/2\pi)*\text{arc tangent}((x-x_{cog,i})/(r-r_{cog,i}))$$

whereby x,y,z are the position of the pixel considered along three perpendicular axis;

$y_{base}$ is the y position of the base;

$\theta_0$, $\theta_e$ are the start- and stop angle over which i rotates (for example 18° and 150°);

$z_{cog}$ is the global center of gravity of the RV;

$x_{cog,i}$, $r_{cog,i}$ are respectively the x and r positions of the center of gravity of the RV in the i-plane;

NSA is the number of concentric circles in the bullseye;

NPSA is the number of sectors in the bullseye.

23. A computer program storage medium readable by a computing system and encoding a computer program of instructions for executing a computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomoscintigraphy corresponding to 3dimensional images at different time bins, said images being defined by pixels;

determining pixels defining at least a part of a wall of the right ventricle, said ventricle having the general shape of a tube with a point of cuvature extending between two valves;

determining for said part an average activity at each time bin, determining for said part for at least a part of the heart cycle, an average slope of activity in function of time bins;

determining for each pixel of the part considered and for the portion of heart cycle considered, an actual slope of activity in function of time bins, and determining a status parameter of pixels defining the part considered, by comparison for the pixel considered, the actual slope of activity with the average slope;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

24. The computer program storage medium of claim 23, in which the transform defines each pixel by parameters characterizing the position of the pixel considered in a plane passing through said pixel and through a base defined between the first and second valves.

25. The computer program storage medium of claim 24, in which the position of each pixel of the peel of the right ventricle is defined by the parameters i and j, said parameter being determined by the following formulas:

$$\theta=\text{arc tangent}((y_{base}-y)/(z-z_{cog}))$$

$$i=NSA*(\theta-\theta_0)/(\theta_e-\theta_0)$$

$$r=\text{sqrt}((y_{base}-y)^2+(z-z_{cog})^2)$$

$$j=(NPSA/2\pi)*\text{arc tangent}((x-x_{cog,i})/(r-r_{cog,i}))$$

whereby x,y,z are the position of the pixel considered along three perpendicular axis;

$y_{base}$ is the y position of the base;

$\theta_0$, $\theta_e$ are the start- and stop angle over which i rotates (for example 18° and 150°));

$z_{cog}$ is the global center of gravity of the RV;

$x_{cog,i}$, $r_{cog,i}$ are respectively the x and r positions of the center of gravity of the RV in the i-plane;

NSA is the number of concentric circles in the bullseye;

NPSA is the number of sectors in the bullseye.

26. A computer program storage medium readable by a computing system and encoding a computer program of instructions for executing a computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomoscintigraphy corresponding to 3dimensional images at different time bins, said images being defined by pixels;

determining pixels defining at least a part of a wall of a region of interest of the heart;

determining for said part an average activity at each time bin, determining for said part for at least a part of the heart cycle, an average slope of activity in function of time bins;

determining a correlation, time bin per time bin, for the pixels of the part considered, between the actual activity and the average activity of the part considered, and determining, from the correlation, a status parameter of pixels defining the part considered, by comparison for the pixel considered, the actual slope of activity with the average slope;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

27. The computer program storage medium of claim 26, in which the transform defines each pixel by parameters characterizing the position of the pixel considered in a plane passing through said pixel and through a base defined between the first and second valves.

28. The computer program storage medium of claim 24, in which the position of each pixel of the peel of the right ventricle is defined by the parameters i and j, said parameter being determined by the following formulas:

$$\theta = \text{arc tangent}((y_{base}-y)/(z-z_{cog}))$$

$$i = NSA*(\theta-\theta_0)/(\theta_e-\theta_0)$$

$$r = \text{sqrt}((y_{base}-y)^2+(z-z_{cog})^2)$$

$$j = (NPSA/2\pi)*\text{arc tangent}((x-x_{cog,i})/(r-r_{cog,i}))$$

whereby x,y,z are the position of the pixel considered along three perpendicular axis;

$y_{base}$ is the y position of the base;

$\theta_0, \theta_e$ are the start- and stop angle over which i rotates (for example 18° and 150°);

$z_{cog}$ is the global center of gravity of the RV;

$x_{cog,i}$, $r_{cog,i}$ are respectively the x and r positions of the center of gravity of the RV in the i-plane;

NSA is the number of concentric circles in the bullseye;

NPSA is the number of sectors in the bullseye.

29. The computer program storage medium of claim 26, in which the computer process determines a correlation, during the heart cycle, for the pixels of the part considered, between the actual activity and the average activity of the part considered.

30. A computer program storage medium readable by a computing system and encoding a computer program of instructions for executing a computer process for the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data obtained from the synchronized electrocardiogram tomographic imaging corresponding to 3dimensional images at different time bins, said images being defined by pixels;

using a matched filter for determining a parameter of pixels in function of a non spatial dimension.

31. the computer program storage medium of claim 30, in which the computer process comprises the steps of:

determining pixels defining at least a part of a wall of a region of interest of the heart;

determining for said part, by using a matched filter, an average activity at each time bin, determining for said part for at least a part of the heart cycle, by using a matched filter, an average slope of activity in function of time bins;

determining for each pixel of the part considered and for the portion of heart cycle considered, an actual slope of activity in function of time bins, and determining a status parameter of pixels defining the part considered, by comparison for the pixel considered, the actual slope of activity with the average slope.

32. The computer program storage medium of claim 30, in which the computer process comprises the step of:

determining for said part an average activity at each time bin, by using a matched filter, determining, by using a matched filter, for said part for at least a part of the heart cycle, an average slope of activity in function of time bins;

determining a correlation, time bin per time bin, for the pixels of the part considered, between the actual activity and the average activity of the part considered, and determining, from the correlation, a status parameter of pixels defining the part considered.

33. The computer program storage medium of claim 30, in which the computer process further comprises the steps of:

determining pixels defining at least a part of a wall of the right ventricle;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

34. The computer program storage medium of claim 32, in which the computer process further comprises the steps of:

determining pixels defining at least a part of a wall of the right ventricle;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

35. A computer program storage medium readable by a computing system and encoding a computer program of instructions for executing a computer process for the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said computer process comprising at least the steps of:

reading data from the electrocardiogram tomoscintigraphy giving images of the activity pixel at each time bin;

determining from said images a variation parameter for pixels over a non-spatial dimension;

determining at least from said variation parameter at least two segments selected from the group consisting of the ventricular segments and the auricular segments;

determining from said at least two segments, a segment selected from the group consisting of the valvular plane and the septum.

36. The storage medium of claim 35, in which the computer process comprises the step of:

determining the ventricular segments and the auricular segments, and determining the valvular plane between said segments.

37. The storage medium of claim 35, in which a segmentation of pixels is operated in function of the determined parameter variation so as to define various segments, in which the segments are merged upto a limited number of segments, and in which a labeling of the segments is operated as being a label selected from the group consisting of ventricular, auricular, right and left.

38. The storage medium of claim 36, in which the ventricle segments and the auricle segments are labeled by at least two different methods, and in which the computer process comprises a voting instruction for labeling the segments as being ventricle or auricle.

39. The storage medium of claim 35, in which the computer process further comprises the steps of:

determining for pixels corresponding to ventricles and auricles, the maximum activity over time;

segmenting the pixels in function of their maximum activity, so as to define segments separated by valley, merging segments with a low valley therebetween up to obtain less than 8 merged segments;

determining at least from said merged segments a ventricle segment and an auricle segment, and labeling the region between the left and right sides as the valvular plane.

40. The storage medium of claim 37, in which the computer process labels the left side and right side segments by at least two different methods, and in which the computer process comprises a voting instruction for labeling the segments as being left or right.

41. The storage medium of claim 37, in which the computer process further comprises the steps of:

determining for pixels corresponding to the left and right side segments, the maximum activity over time;

segmenting the pixels in function of their maximum activity, so as to define segments separated by valley, merging segments with a low valley therebetween up to obtain less than 8 merged segments;

determining at least from said merged segments a left side and a right side of the heart, and labeling the region between the left and right sides as the septum.

42. A method for executing in a computing system the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said method comprising the computer implemented steps of:

reading data obtained from the synchronized electrocardiogram tomoscintigraphy corresponding to 3dimensional images at different time bins, said images being defined by pixels;

normalizing the activity at each time bin;

determining a rigid model comprising a reference;

determining, for each time bin, the correction movement for matching the reference and correcting fot this in each time bin;

determining the time bins for end-systole and end-diastole;

determining the phase and amplitude of pixels of the 3dimensional images;

filtering temporally and spatially substracting the background segmenting the images;

temporal and spatial filtering;

labeling the ventricles and the auricles computing at least a parameter selected from the group consisting of activity curves, thickness of at least a portion of the septum, ventricular movements;

determining of 2D representations ofsegmenrtal motion, and displaying results.

43. The method of claim 42, in which the data read are 3dimentional images at different time bins for at least two different physical states.

44. A method for executing in a computing system the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said method comprising the computer implemented steps of:

reading data obtained from the synchronized electrocardiogram tomographic imaging corresponding to 3dimensional images at different time bins, said images being defined by pixels;

determining from data obtained from the synchronized electrocardiogram tomographic imaging a reference position of a first portion of the heart selected from the group consisting of the valvular plane, at least a portion of the septum and the valvular plane with at least a portion of the septum;

determining from said data obtained from the synchronized electrocardiogram tomographic imaging a position of the the first portion of the heart at each time bin;

for each time bin, determining a movement for matching the first portion at the considered time bin with the reference position of the first portion;

using the determined movement for correcting the 3dimensional images at the different time bins, and using the corrected 3dimensional images for determining an accurate localisation of the heart.

45. The method of claim 43, in which the method comprises the steps of:

determining from data obtained from the synchronized electrocardiogram tomographic imaging a reference position of the valvular plane;

determining from said data obtained from the synchronized electrocardiogram tomographic imaging a position of the valvular plane at each time bin, and for each time bin, determining a movement for matching the valvular plane at the considered time bin with the reference position of the valvular plane.

46. The method of claim 43, in which the method comprises the steps of:

determining from data obtained from the synchronized electrocardiogram tomographic imaging a reference position of the valvular plane and at least a portion of the septum;

determining from said data obtained from the synchronized electrocardiogram tomographic imaging a position of the valvular plane and at least a portion of the septum at each time bin, and for each time bin, determining a movement for matching the valvular plane and at least a portion of the septum at the considered time bin with the reference position of the valvular plane and septum.

47. The method of claim 43, in which the method comprises the steps of:

determining from data obtained from the synchronized electrocardiogram tomographic imaging a reference position of at least a portion of the septum;

determining from said data obtained from the synchronized electrocardiogram tomographic imaging a position of at least a portion of the septum at each time bin, and for each time bin, determining a movement for matching at least a portion of the septum at the considered time bin with the reference position of at least a portion of the septum.

48. A method for executing in a computing system the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said method comprising the computer implemented steps of:

reading data obtained from the synchronized electrocardiogram tomographic imaging corresponding to 3dimensional images at different time bins, said images being defined by pixels;

determining from data obtained from the synchronized electrocardiogram tomographic imaging a position of a portion of the heart selected from the group consisting of the valvular plane, the septum and the valvular plane with at least a portion of the septum;

labeling in the image from said position at least a region of interest selected from the group consisting of left ventricle, right ventricle, left auricle, right auricle, ventricles, auricles, left auricle and left ventricle, right auricle and right ventricle.

49. The method of claim 48, in which said method comprises at least the steps of:

reading data obtained from the synchronized electrocardiogram tomographic imaging corresponding to 3dimensional images at different time bins, said images being defined by pixels;

determining from data obtained from the synchronized electrocardiogram tomographic imaging, at each time bin, a position of a portion of the heart selected from the group consisting of the valvular plane, at least a portion of the septum and the valvular plane with at least a portion of the septum;

labeling in the image at each time bin, from said position at least a region of interest selected from the group consisting of left ventricle, right ventricle, left auricle, right auricle, ventricles, auricles, left auricle and left ventricle, right auricle and right ventricle.

50. The method of claim 48, in which said method comprises at least the steps of:

determining from data obtained from the synchronized electrocardiogram tomographic imaging, a position of the valvular plane with at least a portion of the septum;

labeling in the image, at least a region of interest selected from the group consisting of left ventricle, right ventricle, left auricle, right auricle.

51. The method of claim 48, in which said method comprises at least the steps of:

determining from data obtained from the synchronized electrocardiogram tomographic imaging a position of the valvular plane with at least a portion of the septum;

labeling in the image, from said position, at least two regions of interest selected from the group consisting of left ventricle, right ventricle, left auricle, right auricle.

52. The method of claim 48, in which said method further comprises the steps of:

determining from data obtained from the synchronized electrocardiogram tomographic imaging a reference position of a first portion of the heart selected from the group consisting of the valvular plane, at least a portion of the septum and the valvular plane with at least a portion of the septum;

determining from said data obtained from the synchronized electrocardiogram tomographic imaging a position of the the first portion of the heart at each time bin;

for each time bin, determining a movement for matching the first portion at the considered time bin with the reference position of the first portion;

using the determined movement for correcting the 3dimensional images at the different time bins, and using the corrected 3dimensional images for determining an accurate localisation of the heart.

53. The method of claim 48, in which said method comprises the steps of:

determining from data obtained from the synchronized electrocardiogram tomographic imaging a reference position of the valvular plane;

determining from said data obtained from the synchronized electrocardiogram tomographic imaging a position of the valvular plane at each time bin, and for each time bin, determining a movement for matching the valvular plane at the considered time bin with the reference position of the valvular plane.

54. The method of claim 48, in which said method comprises the steps of:

determining from data obtained from the synchronized electrocardiogram tomographic imaging a reference position of the valvular plane and at least a portion of the septum;

determining from said data obtained from the synchronized electrocardiogram tomographic imaging a position of the valvular plane and at least a portion of the septum at each time bin, and for each time bin, determining a movement for matching the valvular plane and the septum at the considered time bin with the reference position of the valvular plane and septum.

55. The method of claim 48, in which said method comprises the steps of:

determining from data obtained from the synchronized electrocardiogram tomographic imaging a reference position of at least a portion of the septum;

determining from said data obtained from the synchronized electrocardiogram tomographic imaging a position of at least a portion of the septum at each time bin, and for each time bin, determining a movement for matching at least a portion of the septum at the considered time bin with the reference position of at least a portion of the septum.

56. A method for executing in a computing system the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said method comprising the computer implemented steps of:

reading data obtained from the synchronized electrocardiogram tomoscintigraphy corresponding to 3dimensional images at different time bins, said images being defined by pixels;

determining and labeling from data obtained from the synchronized electrocardiogram tomoscintigraphy at least a segment corresponding to at least a part of an organ selected from the group consisting of aorta descendens, spleen, liver, valvular plane, the septum, ventricle, auricle.

57. The method of claim 56, in which the method comprises the steps of:

labelling in the image a region corresponding to the Aorta descendens;

labeling in the image a region corresponding to the spleen;

labelling in the image a region corresponding to the valvular plane and a region corresponding to the septum;

from said labeled regions of the valvular plane and septum, determining and labeling in the image regions corresponding to the ventricles and the auricles.

58. A method for executing in a computing system the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said method comprising the computer implemented steps of:

reading data obtained from the synchronized electrocardiogram tomoscintigraphy corresponding to 3dimensional images at different time bins, said images being defined by pixels;

determining pixels defining at least a part of a wall of a region of interest of the heart;

determining for said part an average activity at each time bin, determining for said part for at least a part of the heart cycle, an average slope of activity in function of time bins;

determining for each pixel of the part considered and for the portion of heart cycle considered, an actual slope of activity in function of time bins, and determining a status parameter of pixels defining the part considered, by comparison for the pixel considered, the actual slope of activity with the average slope.

59. A method for executing in a computing system the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said method comprising the computer implemented steps of:

reading data obtained from the synchronized electrocardiogram tomoscintigraphy corresponding to 3dimensional images at different time bins, said images being defined by pixels;

determining pixels defining at least a part of a wall of a region of interest of the heart;

determining for said part an average activity at each time bin, determining for said part for at least a part of the heart cycle, an average slope of activity in function of time bins;

determining a correlation, time bin per time bin, for the pixels of the part considered, between the actual activity and the average activity of the part considered, and determining, from the correlation, a status parameter of pixels defining the part considered.

60. The method of claim 59, in which the methods determines a correlation, during the heart cycle, for the pixels of the part considered, between the actual activity and the average activity of the part considered.

61. A method for executing in a computing system the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said method comprising the computer implemented steps of:

reading data obtained from the synchronized electrocardiogram tomographic imaging corresponding to 3dimensional images at different time bins, said images being defined by pixels;

determining pixels defining at least a part of the peel of the right ventricles, said ventricle having the general shape of a tube with a point of cuvature extending between two valves;

determining a 3dimensional parameter for the pixels considered;

using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered.

62. The method of claim 61, in which the transform defines each pixel by parameters characterizing the position of the pixel considered in a plane passing through said pixel and through a base defined between the first and second valves.

63. The method of claim 61, in which the position of each pixel of the peel of the right ventricle is defined by the parameters i and j, said parameter being determined by the following formulas:

$\theta = \text{arc tangent}((y_{base}-y)/(z-z_{cog}))$ $i = NSA*(\theta-\theta_0)/(\theta_e-\theta_0)$ $r = \text{sqrt}((y_{base}-y)^2+(z-z_{cog})^2)$ $j = (NPSA/2\pi)*\text{arc tangent}((x-x_{cog,i})/(r-r_{cog,i}))$ whereby x,y,z are the position of the pixel considered along three perpendicular axis;

$y_{base}$ is the y position of the base;

$\theta_0, \theta_e$ are the start- and stop angle over which i rotates (for example 18° and 150°);

$z_{cog}$ is the global center of gravity of the RV;

$x_{cog,i}, r_{cog,i}$ are respectively the x and r positions of the center of gravity of the RV in the i-plane;

NSA is the number of concentric circles in the bullseye;

NPSA is the number of sectors in the bullseye.

64. A method for executing in a computing system the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said method comprising the computer implemented steps of:

reading data obtained from the synchronized electrocardiogram tomographic imaging corresponding to 3dimensional images at different time bins, said images being defined by pixels;

determining pixels defining at least a part of a wall of the right ventricle, said ventricle having the general shape of a tube with a point of cuvature extending between two valves;

determining for said part an average activity at each time bin, determining for said part for at least a part of the heart cycle, an average slope of activity in function of time bins;

determining for each pixel of the part considered and for the portion of heart cycle considered, an actual slope of activity in function of time bins, and determining a status parameter of pixels defining the part considered, by comparison for the pixel considered, the actual slope of activity with the average slope;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

65. The method of claim 64, in which the transform defines each pixel by parameters characterizing the position of the pixel considered in a plane passing through said pixel and through a base defined between the first and second valves.

66. The method of claim 64, in which the position of each pixel of the peel of the right ventricle is defined by the parameters i and j, said parameter being determined by the following formulas:

$\theta = \text{arc tangent}((y_{base}-y)/(z-z_{cog}))$ $i = NSA*(\theta-\theta_0)/(\theta_e-\theta_0)$ $r = \text{sqrt}((y_{base}-y)^2+(z-z_{cog})^2)$ $j = (NPSA/2\pi)*\text{arc tangent}((x-x_{cog,i})/(r-r_{cog,i}))$ whereby x,y,z are the position of the pixel considered along three perpendicular axis;

$y_{base}$ is the y position of the base;

$\theta_0, \theta_e$ are the start- and stop angle over which i rotates (for example 18° and 150°);

$z_{cog}$ is the global center of gravity of the RV;

$x_{cog,i}, r_{cog,i}$ are respectively the x and r positions of the center of gravity of the RV in the i-plane;

NSA is the number of concentric circles in the bullseye;

NPSA is the number of sectors in the bullseye.

67. A method for executing in a computing system the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said method comprising the computer implemented steps of:

reading data obtained from the synchronized electrocardiogram tomographic imaging corresponding to 3dimensional images at different time bins, said images being defined by pixels;

determining pixels defining at least a part of a wall of a region of interest of the heart;

determining for said part an average activity at each time bin, determining for said part for at least a part of the heart cycle, an average slope of activity in function of time bins;

determining a correlation, time bin per time bin, for the pixels of the part considered, between the actual activity and the average activity of the part considered, and determining, from the correlation, a status parameter of pixels defining the part considered, by comparison for the pixel considered, the actual slope of activity with the average slope;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

68. The method of claim 67, in which the transform defines each pixel by parameters characterizing the position of the pixel considered in a plane passing through said pixel and through a base defined between the first and second valves.

69. The method of claim 67, in which the position of each pixel of the peel of the right ventricle is defined by the parameters i and j, said parameter being determined by the following formulas:

$\theta$arc tangent$((y_{base}-y)/(z-z_{cog}))$ $i=NSA*(\theta-\theta_0)/(\theta_e-\theta_0)$ $r=sqrt((y_{base}-y)^2+(z-z_{cog})^2)$ $j=(NPSA/2\pi)*$arc tangent $((x-x_{cog,i})/(r-r_{cog,i})$ whereby x,y,z are the position of the pixel considered along three perpendicular axis;

$y_{base}$ is the y position of the base;

74 $_0$, $\theta_e$ are the start- and stop angle over which i rotates (for example 18° and 150°);

$z_{cog}$ is the global center of gravity of the RV;

$x_{cog,i}$, $r_{cog,i}$ are respectively the x and r positions of the center of gravity of the RV in the i-plane;

NSA is the number of concentric circles in the bullseye;

NPSA is the number of sectors in the bullseye.

70. The method of claim 67, in which the computer process determines a correlation, during the heart cycle, for the pixels of the part considered, between the actual activity and the average activity of the part considered.

71. A method for executing in a computing system the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said method comprising the computer implemented steps of:

reading data obtained from the synchronized electrocardiogram tomographic imaging corresponding to 3dimensional images at different time bins, said images being defined by pixels;

using a matched filter for determining a parameter of pixels in function of a non spatial dimension.

72. The method of claim 71, which comprises the steps of:

determining pixels defining at least a part of a wall of a region of interest of the heart;

determining for said part, by using a matched filter, an average activity at each time bin, determining for said part for at least a part of the heart cycle, by using a matched filter, an average slope of activity in function of time bins;

determining for each pixel of the part considered and for the portion of heart cycle considered, an actual slope of activity in function of time bins, and determining a status parameter of pixels defining the part considered, by comparison for the pixel considered, the actual slope of activity with the average slope.

73. The method of claim 71, which comprises the step of:

determining for said part an average activity at each time bin, by using a matched filter, determining, by using a matched filter, for said part for at least a part of the heart cycle, an average slope of activity in function of time bins;

determining a correlation, time bin per time bin, for the pixels of the part considered, between the actual activity and the average activity of the part considered, and determining, from the correlation, a status parameter of pixels defining the part considered.

74. The method of claim 71, which further comprises the steps of:

determining pixels defining at least a part of a wall of the right ventricle;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

75. The method of claim 73, which further comprises the steps of:

determining pixels defining at least a part of a wall of the right ventricle;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

76. A method for executing in a computing system the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said method comprising the computer implemented steps of:

reading data from the electrocardiogram tomoscintigraphy giving images of the activity pixel at each time bin;

determining from said images a variation parameter for pixels over a nonspatial dimension;

determining at least from said variation parameter at least two segments selected from the group consisting of the ventricular segments and the auricular segments;

determining from said at least two segments, a segment selected from the group consisting of the valvular plane and the septum.

77. The method of claim 76, which comprises the step of:

determining the ventricular segments and the auricular segments, and determining the valvular plane between said segments.

78. The method of claim 76, in which a segmentation of pixels is operated in function of the determined parameter variation so as to define various segments, in which the segments are merged upto a limited number of segments, and in which a labeling of the segments is operated as being a label selected from the group consisting of ventricular, auricular, right and left.

79. The method of claim 77, in which the ventricle segments and the auricle segments are labeled by at least two different methods, and in which the computer process comprises a voting instruction for labeling the segments as being ventricle or auricle.

80. The method of claim 76, which further comprises the steps of:

determining for pixels corresponding to ventricles and auricles, the maximum activity over time;

segmenting the pixels in function of their maximum activity, so as to define segments separated by valley, merging segments with a low valley therebetween up to obtain less than 8 merged segments;

determining at least from said merged segments a ventricle segment and an auricle segment, and labeling the region between the left and right sides as the valvular plane.

81. The method of claim 78, which labels the left side and right side segments by at least two different methods, and which comprises a voting instruction for labeling the segments as being left or right.

82. The method of claim 78, which further comprises the steps of:

determining for pixels corresponding to the left and right side segments, the maximum activity over time;

segmenting the pixels in function of their maximum activity, so as to define segments separated by valley, merging segments with a low valley therebetween up to obtain less than 8 merged segments;

determining at least from said merged segments a left side and a right side of the heart, and labeling the region between the left and right sides as the septum.

83. An apparatus for executing in a computing system the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said apparatus comprising at least means for executing the followings:

reading data obtained from the synchronized electrocardiogram tomoscintigraphy corresponding to 3dimensional images at different time bins, said images being defined by pixels;

normalizing the activity at each time bin;

determining a rigid model comprising a reference;

determining, for each time bin, the correction movement for matching the reference and correcting fot this in each time bin;

determining the time bins for end-systole and end-diastole;

determining the phase and amplitude of pixels of the 3dimensional images;

filtering temporally and spatially substracting the background segmenting the images;

temporal and spatial filtering;

labeling the ventricles and the auricles computing at least a parameter selected from the group consisting of activity curves, thickness of at least a portion of the septum, ventricular movements;

determining of 2D representations ofsegmenrtal motion, and displaying results.

84. The apparatus of claim 83, which comprises means for reading 3dimentional images at different time bins for at least two different physical states.

85. An apparatus for executing in a computing system the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said apparatus comprising at least means for executing the followings:

reading data obtained from the synchronized electrocardiogram tomographic imaging corresponding to 3dimensional images at different time bins, said images being defined by pixels;

determining from data obtained from the synchronized electrocardiogram tomographic imaging a reference position of a first portion of the heart selected from the group consisting of the valvular plane, at least a portion of the septum and the valvular plane with at least a portion of the septum;

determining from said data obtained from the synchronized electrocardiogram tomographic imaging a position of the the first portion of the heart at each time bin;

for each time bin, determining a movement for matching the first portion at the considered time bin with the reference position of the first portion using the determined movement for correcting the 3dimensional images at the different time bins, and using the corrected 3dimensional images for determining an accurate localisation of the heart.

86. The apparatus of claim 85, which, comprises at least means for:

determining from data obtained from the synchronized electrocardiogram tomographic imaging a reference position of the valvular plane;

determining from said data obtained from the synchronized electrocardiogram tomographic imaging a position of the valvular plane at each time bin, and for each time bin, determining a movement for matching the valvular plane at the considered time bin with the reference position of the valvular plane.

87. The apparatus of claim 85, which comprises at least means for:

determining from data obtained from the synchronized electrocardiogram tomographic imaging a reference position of the valvular plane and at least a portion of the septum;

determining from said data obtained from the synchronized electrocardiogram tomographic imaging a position of the valvular plane and at least a portion of the septum at each time bin, and for each time bin, determining a movement for matching the valvular plane and at least a portion of the septum at the considered time bin with the reference position of the valvular plane and septum.

88. The apparatus of claim 85, which, comprises at least means for:

determining from data obtained from the synchronized electrocardiogram tomographic imaging a reference position of at least a portion of the septum;

determining from said data obtained from the synchronized electrocardiogram tomographic imaging a position of at least a portion of the septum at each time bin, and for each time bin, determining a movement for matching at least a portion of the septum at the considered time bin with the reference position of at least a portion of the septum.

89. An apparatus for executing in a computing system the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said apparatus comprising at least means for executing the followings:

reading data obtained from the synchronized electrocardiogram tomographic imaging corresponding to 3dimensional images at different time bins, said images being defined by pixels;

determining from data obtained from the synchronized electrocardiogram tomographic imaging a position of a portion of the heart selected from the group consisting of the valvular plane, at least a portion of the septum and the valvular plane with at least a portion of the septum;

labeling in the image from said position at least a region of interest selected from the group consisting of left ventricle, right ventricle, left auricle, right auricle, ventricles, auricles, left auricle and left ventricle, right auricle and right ventricle.

90. The apparatus of claim 89, which comprises at least means for:

reading data obtained from the synchronized electrocardiogram tomographic imaging corresponding to 3dimensional images at different time bins, said images being defined by pixels;

determining from data obtained from the synchronized electrocardiogram tomographic imaging, at each time bin, a position of a portion of the heart selected from the group consisting of the valvular plane, at least a portion of the septum and the valvular plane with at least a portion of the septum;

labeling in the image at each time bin, from said position at least a region of interest selected from the group consisting of left ventricle, right ventricle, left auricle, right auricle, ventricles, auricles, left auricle and left ventricle, right auricle and right ventricle.

91. The apparatus of claim 89, which comprises at least means for:

determining from data obtained from the synchronized electrocardiogram tomographic imaging, a position of the valvular plane with at least a portion of the septum;

labeling in the image, at least a region of interest selected from the group consisting of left ventricle, right ventricle, left auricle, right auricle.

92. The apparatus of claim 89, which comprises at least means for:

determining from data obtained from the synchronized electrocardiogram tomographic imaging a position of the valvular plane with at least a portion of the septum;

labeling in the image, from said position, at least two regions of interest selected from the group consisting of left ventricle, right ventricle, left auricle, right auricle.

93. The apparatus of claim 89, which comprises at least means for:

determining from data obtained from the synchronized electrocardiogram tomographic imaging a reference position of a first portion of the heart selected from the group consisting of the valvular plane, at least a portion of the septum and the valvular plane with at least a portion of the septum;

determining from said data obtained from the synchronized electrocardiogram tomographic imaging a position of the the first portion of the heart at each time bin;

for each time bin, determining a movement for matching the first portion at the considered time bin with the reference position of the first portion;

using the determined movement for correcting the 3dimensional images at the different time bins, and using the corrected 3dimensional images for determining an accurate localisation of the heart.

94. The apparatus of claim 89, which comprises at least means for:

determining from data obtained from the synchronized electrocardiogram tomographic imaging a reference position of the valvular plane;

determining from said data obtained from the synchronized electrocardiogram tomographic imaging a position of the valvular plane at each time bin, and for each time bin, determining a movement for matching the valvular plane at the considered time bin with the reference position of the valvular plane.

95. The apparatus of claim 89, which comprises at least means for:

determining from data obtained from the synchronized electrocardiogram tomographic imaging a reference position of the valvular plane and at least a portion of the septum;

determining from said data obtained from the synchronized electrocardiogram tomographic imaging a position of the valvular plane and at least a portion of the septum at each time bin, and for each time bin, determining a movement for matching the valvular plane and at least a portion of the septum at the considered time bin with the reference position of the valvular plane and septum.

96. The apparatus of claim 89, which comprises at least means for:

determining from data obtained from the synchronized electrocardiogram tomographic imaging a reference position of at least a portion of the septum;

determining from said data obtained from the synchronized electrocardiogram tomographic imaging a position of at least a portion of the septum at each time bin, and for each time bin, determining a movement for matching at least a portion of the septum at the considered time bin with the reference position of at least a portion of the septum.

97. An apparatus for executing in a computing system the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said apparatus comprising at least means for executing the followings:

reading data obtained from the synchronized electrocardiogram tomoscintigraphy corresponding to 3dimensional images at different time bins, said images being defined by pixels;

determining and labeling from data obtained from the synchronized electrocardiogram tomoscintigraphy at least a segment corresponding to at least a part of an organ selected from the group consisting of aorta descendens, spleen, liver, valvular plane, the septum, ventricle, auricle.

98. The apparatus of claim 97, which comprises means for:

labelling in the image a region corresponding to the Aorta descendens;

labeling in the image a region corresponding to the spleen;

labelling in the image a region corresponding to the valvular plane and a region correponding to the septum;

from said labeled regions of the valvular plane and septum, determining and labeling in the image regions corresponding to the ventricles and the auricles.

99. An apparatus for executing in a computing system the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said apparatus comprising at least means for executing the followings:

reading data obtained from the synchronized electrocardiogram tomoscintigraphy corresponding to 3dimensional images at different time bins, said images being defined by pixels;

determining pixels defining at least a part of a wall of a region of interest of the heart;

determining for said part an average activity at each time bin, determining for said part for at least a part of the heart cycle, an average slope of activity in function of time bins;

determining for each pixel of the part considered and for the portion of heart cycle considered, an actual slope of activity in function of time bins, and determining a status parameter of pixels defining the part considered, by comparison for the pixel considered, the actual slope of activity with the average slope.

100. An apparatus for executing in a computing system the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said apparatus comprising at least means for executing the followings:

reading data obtained from the synchronized electrocardiogram tomoscintigraphy corresponding to 3dimensional images at different time bins, said images being defined by pixels;

determining pixels defining at least a part of a wall of a region of interest of the heart;

determining for said part an average activity at each time bin, determining for said part for at least a part of the heart cycle, an average slope of activity in function of time bins;

determining a correlation, time bin per time bin, for the pixels of the part considered, between the actual activity and the average activity of the part considered, and determining, from the correlation, a status parameter of pixels defining the part considered.

101. The apparatus of claim 100, which comprises means for determining a correlation, during the heart cycle, for the pixels of the part considered, between the actual activity and the average activity of the part considered.

102. An apparatus for executing in a computing system the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said apparatus comprising at least means for executing the followings:

reading data obtained from the synchronized electrocardiogram tomographic imaging corresponding to 3dimensional images at different time bins, said images being defined by pixels;

determining pixels defining at least a part of the peel of the right ventricles, said ventricle having the general shape of a tube with a point of cuvature extending between two valves;

determining a 3dimensional parameter for the pixels considered;

using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered.

103. The apparatus of claim 102, in which the transform defines each pixel by parameters characterizing the position of the pixel considered in a plane passing through said pixel and through a base defined between the first and second valves.

104. The apparatus of claim 102, in which the position of each pixel of the peel of the right ventricle is defined by the parameters i and j, said parameter being determined by the following formulas:

$$\theta \text{arc tangent}((y_{base}-y)/(z-z_{cog}))$$

$$i=NSA*(\theta-\theta_0)/(\theta_e-\theta_0)$$

$$r=\text{sqrt}((y_{base}-y)^2+(z-z_{cog})^2)$$

$$j=(NPSA/2\pi)*\text{arc tangent } ((x-x_{cog,i})/(r-r_{cog,i}))$$

whereby x,y,z are the position of the pixel considered along three perpendicular axis;

$y_{base}$ is the y position of the base;

$\theta_0$, $\theta_e$ are the start- and stop angle over which i rotates (for example 18° and 150°);

$z_{cog}$ is the global center of gravity of the RV;

$x_{cog,i}$, $r_{cog,i}$ are respectively the x and r positions of the center of gravity of the RV in the i-plane;

NSA is the number of concentric circles in the bullseye;

NPSA is the number of sectors in the bullseye.

105. An apparatus for executing in a computing system the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said apparatus comprising at least means for executing the followings:

reading data obtained from the synchronized electrocardiogram tomographic imaging corresponding to 3dimensional images at different time bins, said images being defined by pixels;

determining pixels defining at least a part of a wall of the right ventricle, said ventricle having the general shape of a tube with a point of cuvature extending between two valves;

determining for said part an average activity at each time bin, determining for said part for at least a part of the heart cycle, an average slope of activity in function of time bins;

determining for each pixel of the part considered and for the portion of heart cycle considered, an actual slope of activity in function of time bins, and determining a status parameter of pixels defining the part considered, by comparison for the pixel considered, the actual slope of activity with the average slope;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

106. The apparatus of claim 105, in which the transform defines each pixel by parameters characterizing the position of the pixel considered in a plane passing through said pixel and through a base defined between the first and second valves.

107. The apparatus of claim 105, in which the position of each pixel of the peel of the right ventricle is defined by the parameters i and j, said parameter being determined by the following formulas:

$$\theta=\text{arc tangent}((y_{base}-y)/(z-z_{cog}))$$

$$i=NSA*(\theta-\theta_0)/(\theta_e-\theta_0)$$

$$r=\text{sqrt}((y_{base}-y)^2+(z-z_{cog})^2)$$

$$j=(NPSA/2\pi)*\text{arc tangent}((x-x_{cog,i})/(r-r_{cog,i}))$$

whereby x,y,z are the position of the pixel considered along three perpendicular axis;

$y_{base}$ is the y position of the base;

$\theta_0$, $\theta_e$ are the start- and stop angle over which i rotates (for example 18° and 150°);

$z_{cog}$ is the global center of gravity of the RV;

$x_{cog,i}$, $r_{cog,i}$ are respectively the x and r positions of the center of gravity of the RV in the i-plane;

NSA is the number of concentric circles in the bullseye;

NPSA is the number of sectors in the bullseye.

108. An apparatus for executing in a computing system the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said apparatus comprising at least means for executing the followings:

reading data obtained from the synchronized electrocardiogram tomographic imaging corresponding to 3dimensional images at different time bins, said images being defined by pixels;

determining pixels defining at least a part of a wall of a region of interest of the heart;

determining for said part an average activity at each time bin, determining for said part for at least a part of the heart cycle, an average slope of activity in function of time bins;

determining a correlation, time bin per time bin, for the pixels of the part considered, between the actual activity and the average activity of the part considered, and determining, from the correlation, a status parameter of pixels defining the part considered, by comparison for the pixel considered, the actual slope of activity with the average slope;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

109. The apparatus of claim 108, in which the transform defines each pixel by parameters characterizing the position of the pixel considered in a plane passing through said pixel and through a base defined between the first and second valves.

110. The apparatus of claim 108, in which the position of each pixel of the peel of the right ventricle is defined by the parameters i and j, said parameter being determined by the following formulas:

$\theta = \text{arc tangent}((y_{base}-y)/(z-z_{cog}))$ $i = NSA*(\theta-\theta_0)/(\theta_e-\theta_0)$ $r = \text{sqrt}((y_{base}-y)^2+(z-z_{cog})^2)$ $j = (NPSA/2\pi)*\text{arc tangent}((x-x_{cog,i})/(r-r_{cog,i}))$ whereby x,y,z are the position of the pixel considered along three perpendicular axis;

$y_{base}$ is the y position of the base;

$\theta_0, \theta^e$ are the start- and stop angle over which i rotates (for example 18° and 150°);

$z_{cog}$ is the global center of gravity of the RV;

$x_{cog,i}, r_{cog,i}$ are respectively the x and r positions of the center of gravity of the RV in the i-plane;

NSA is the number of concentric circles in the bullseye;

NPSA is the number of sectors in the bullseye.

111. The apparatus of claim 108, which comprises means for determining a correlation, during the heart cycle, for the pixels of the part considered, between the actual activity and the average activity of the part considered.

112. An apparatus for executing in a computing system the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said apparatus comprising at least means for executing the followings:

reading data obtained from the synchronized electrocardiogram tomographic imaging corresponding to 3dimensional images at different time bins, said images being defined by pixels;

using a matched filter for determining a parameter of pixels in function of a non spatial dimension.

113. The apparatus of claim 112, which comprises means for:

determining pixels defining at least a part of a wall of a region of interest of the heart;

determining for said part, by using a matched filter, an average activity at each time bin, determining for said part for at least a part of the heart cycle, by using a matched filter, an average slope of activity in function of time bins;

determining for each pixel of the part considered and for the portion of heart cycle considered, an actual slope of activity in function of time bins, and determining a status parameter of pixels defining the part considered, by comparison for the pixel considered, the actual slope of activity with the average slope.

114. The apparatus of claim 112, which comprises means for:

determining for said part an average activity at each time bin, by using a matched filter, determining, by using a matched filter, for said part for at least a part of the heart cycle, an average slope of activity in function of time bins determining a correlation, time bin per time bin, for the pixels of the part considered, between the actual activity and the average activity of the part considered, and determining, from the correlation, a status parameter of pixels defining the part considered.

115. The apparatus of claim 112, which comprises means for:

determining pixels defining at least a part of a wall of the right ventricle;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

116. The apparatus of claim 114, which comprises means for:
- determining pixels defining at least a part of a wall of the right ventricle;
- determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and
- representing the status parameter of the pixel in said two dimensional representation.

117. An apparatus for executing in a computing system the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said apparatus comprising at least means for executing the followings:
- reading data from the electrocardiogram tomoscintigraphy giving images of the activity pixel at each time bin;
- determining from said images a variation parameter for pixels over a non-spatial dimension;
- determining at least from said variation parameter at least two segments selected from the group consisting of the ventricular segments and the auricular segments;
- determining from said at least two segments, a segment selected from the group consisting of the valvular plane and the septum.

118. The apparatus of claim 117, which comprises means for:
- determining the ventricular segments and the auricular segments, and
- determining the valvular plane between said segments.

119. The apparatus of claim 117, which comprises a means for segmenting pixels in function of the determined parameter variation so as to define various segments, in which the segments are merged upto a limited number of segments, and a means for labeling the segments with a label selected from the group consisting of ventricular, auricular, right and left.

120. The apparatus of claim 118, in which the ventricle segments and the auricle segments are labeled by at least two different methods, and in which the computer process comprises a voting instruction for labeling the segments as being ventricle or auricle.

121. The apparatus of claim 117, which comprises means for:
- determining for pixels corresponding to ventricles and auricles, the maximum activity over time;
- segmenting the pixels in function of their maximum activity, so as to define segments separated by valley,
- merging segments with a low valley therebetween up to obtain less than 8 merged segments;
- determining at least from said merged segments a ventricle segment and an auricle segment, and
- labeling the region between the left and right sides as the valvular plane.

122. The apparatus of claim 119, which comprises means for labeling the left side and right side segments by at least two different methods, and a voting means for labeling the segments as being left or right.

123. The apparatus of claim 119, which comprises means for:
- determining for pixels corresponding to the left and right side segments, the maximum activity over time;
- segmenting the pixels in function of their maximum activity, so as to define segments separated by valley,
- merging segments with a low valley therebetween up to obtain less than 8 merged segments;
- determining at least from said merged segments a left side and a right side of the heart, and
- labeling the region between the left and right sides as the septum.

124. An apparatus for synchronized electrocardiogram tomoscintigraphy, said apparatus comprising a computing system for executing the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said computing system comprising at least means for executing the followings:
- reading data obtained from the synchronized electrocardiogram tomoscintigraphy corresponding to 3dimensional images at different time bins, said images being defined by pixels;
- normalizing the activity at each time bin;
- determining a rigid model comprising a reference;
- determining, for each time bin, the correction movement for matching the reference and correcting fot this in each time bin;
- determining the time bins for end-systole and end-diastole;
- determining the phase and amplitude of pixels of the 3dimensional images;
- filtering temporally and spatially
- substracting the background
- segmenting the images;
- temporal and spatial filtering;
- labeling the ventricles and the auricles
- computing at least a parameter selected from the group consisting of activity curves, thickness of at least a portion of the septum, ventricular movements;
- determining of 2D representations ofsegmenrtal motion, and
- displaying results.

125. The apparatus of claim 124, which comprises means for reading 3dimentional images at different time bins for at least two different physical states.

126. An apparatus for synchronized electrocardiogram tomographic imaging, said apparatus comprising a computing system for executing the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said computing system comprising at least means for executing the followings:

reading data obtained from the synchronized electrocardiogram tomographic imaging corresponding to 3dimensional images at different time bins, said images being defined by pixels;

determining from data obtained from the synchronized electrocardiogram tomographic imaging a reference position of a first portion of the heart selected from the group consisting of the valvular plane, at least a portion of the septum and the valvular plane with at least a portion of the septum;

determining from said data obtained from the synchronized electrocardiogram tomographic imaging a position of the the first portion of the heart at each time bin;

for each time bin, determining a movement for matching the first portion at the considered time bin with the reference position of the first portion;

using the determined movement for correcting the 3dimensional images at the different time bins, and using the corrected 3dimensional images for determining an accurate localisation of the heart.

127. The apparatus of claim 126, which, comprises at least means for:

determining from data obtained from the synchronized electrocardiogram tomographic imaging a reference position of the valvular plane;

determining from said data obtained from the synchronized electrocardiogram tomographic imaging a position of the valvular plane at each time bin, and for each time bin, determining a movement for matching the valvular plane at the considered time bin with the reference position of the valvular plane.

128. The apparatus of claim 126, which, comprises at least means for: determining from data obtained from the synchronized electrocardiogram tomographic imaging a reference position of the valvular plane and at least a portion of the septum;

determining from said data obtained from the synchronized electrocardiogram tomographic imaging a position of the valvular plane and at least a portion of the septum at each time bin, and for each time bin, determining a movement for matching the valvular plane and at least a portion of the septum at the considered time bin with the reference position of the valvular plane and septum.

129. The apparatus of claim 126, which, comprises at least means for:

determining from data obtained from the synchronized electrocardiogram tomographic imaging a reference position of at least a portion of the septum;

determining from said data obtained from the synchronized electrocardiogram tomographic imaging a position of at least a portion of the septum at each time bin, and for each time bin, determining a movement for matching at least a portion of the septum at the considered time bin with the reference position of at least a portion of the septum.

130. An apparatus for synchronized electrocardiogram tomographic imaging, said apparatus comprising a computing system for executing the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said computing system comprising at least means for executing the followings:

reading data obtained from the synchronized electrocardiogram tomographic imaging corresponding to 3dimensional images at different time bins, said images being defined by pixels;

determining from data obtained from the synchronized electrocardiogram tomographic imaging a position of a portion of the heart selected from the group consisting of the valvular plane, at least a portion of the septum and the valvular plane with at least a portion of the septum;

labeling in the image from said position at least a region of interest selected from the group consisting of left ventricle, right ventricle, left auricle, right auricle, ventricles, auricles, left auricle and left ventricle, right auricle and right ventricle.

131. The apparatus of claim 130, which comprises at least means for:

reading data obtained from the synchronized electrocardiogram tomographic imaging corresponding to 3dimensional images at different time bins, said images being defined by pixels;

determining from data obtained from the synchronized electrocardiogram tomographic imaging, at each time bin, a position of a portion of the heart selected from the group consisting of the valvular plane, at least a portion of the septum and the valvular plane with at least a portion of the septum;

labeling in the image at each time bin, from said position at least a region of interest selected from the group consisting of left ventricle, right ventricle, left auricle, right auricle, ventricles, auricles, left auricle and left ventricle, right auricle and right ventricle.

132. The apparatus of claim 130, which comprises at least means for:

determining from data obtained from the synchronized electrocardiogram tomographic imaging, a position of the valvular plane with at least a portion of the septum;

labeling in the image, at least a region of interest selected from the group consisting of left ventricle, right ventricle, left auricle, right auricle.

133. The apparatus of claim 130, which comprises at least means for:

determining from data obtained from the synchronized electrocardiogram tomographic imaging a position of the valvular plane with at least a portion of the septum;

labeling in the image, from said position, at least two regions of interest selected from the group consisting of left ventricle, right ventricle, left auricle, right auricle.

134. The apparatus of claim 130, which comprises at least means for:
  determining from data obtained from the synchronized electrocardiogram tomographic imaging a reference position of a first portion of the heart selected from the group consisting of the valvular plane, at least a portion of the septum and the valvular plane with at least a portion of the septum;
  determining from said data obtained from the synchronized electrocardiogram tomographic imaging a position of the the first portion of the heart at each time bin;
  for each time bin, determining a movement for matching the first portion at the considered time bin with the reference position of the first portion;
  using the determined movement for correcting the 3dimensional images at the different time bins, and
  using the corrected 3dimensional images for determining an accurate localisation of the heart.

135. The apparatus of claim 130, which comprises at least means for:
  determining from data obtained from the synchronized electrocardiogram tomographic imaging a reference position of the valvular plane;
  determining from said data obtained from the synchronized electrocardiogram tomographic imaging a position of the valvular plane at each time bin, and
  for each time bin, determining a movement for matching the valvular plane at the considered time bin with the reference position of the valvular plane.

136. The apparatus of claim 130, which comprises at least means for:
  determining from data obtained from the synchronized electrocardiogram tomographic imaging a reference position of the valvular plane and at least a portion of the septum;
  determining from said data obtained from the synchronized electrocardiogram tomographic imaging a position of the valvular plane and at least a portion of the septum at each time bin, and
  for each time bin, determining a movement for matching the valvular plane and at least a portion of the septum at the considered time bin with the reference position of the valvular plane and septum.

137. The apparatus of claim 130, which comprises at least means for:
  determining from data obtained from the synchronized electrocardiogram tomographic imaging a reference position of at least a portion of the septum;
  determining from said data obtained from the synchronized electrocardiogram tomographic imaging a position of at least a portion of the septum at each time bin, and
  for each time bin, determining a movement for matching at least a portion of the septum at the considered time bin with the reference position of at least a portion of the septum.

138. An apparatus for synchronized electrocardiogram tomoscintigraphy, said apparatus comprising a computing system for executing the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said computing system comprising at least means for executing the followings:
  reading data obtained from the synchronized electrocardiogram tomoscintigraphy corresponding to 3dimensional images at different time bins, said images being defined by pixels;
  determining and labeling from data obtained from the synchronized electrocardiogram tomoscintigraphy at least a segment corresponding to at least a part of an organ selected from the group consisting of aorta descendens, spleen, liver, valvular plane, the septum, ventricle, auricle.

139. The apparatus of claim 138, which comprises means for:
  labelling in the image a region corresponding to the Aorta descendens;
  labeling in the image a region corresponding to the spleen;
  labelling in the image a region corresponding to the valvular plane and a region correponding to the septum;
  from said labeled regions of the valvular plane and septum, determining and labeling in the image regions corresponding to the ventricles and the auricles.

140. An apparatus for synchronized electrocardiogram tomoscintigraphy, said apparatus comprising a computing system for executing the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said computing system comprising at least means for executing the followings:
  reading data obtained from the synchronized electrocardiogram tomoscintigraphy corresponding to 3dimensional images at different time bins, said images being defined by pixels;
  determining pixels defining at least a part of a wall of a region of interest of the heart;
  determining for said part an average activity at each time bin,
  determining for said part for at least a part of the heart cycle, an average slope of activity in function of time bins;
  determining for each pixel of the part considered and for the portion of heart cycle considered, an actual slope of activity in function of time bins, and determining a status parameter of pixels defining the part considered, by comparison for the pixel considered, the actual slope of activity with the average slope.

141. An apparatus for synchronized electrocardiogram tomoscintigraphy, said apparatus comprising a computing system for executing the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said computing system comprising at least means for executing the followings:
- reading data obtained from the synchronized electrocardiogram tomoscintigraphy corresponding to 3dimensional images at different time bins, said images being defined by pixels;
- determining pixels defining at least a part of a wall of a region of interest of the heart;
- determining for said part an average activity at each time bin,
- determining for said part for at least a part of the heart cycle, an average slope of activity in function of time bins;
- determining a correlation, time bin per time bin, for the pixels of the part considered, between the actual activity and the average activity of the part considered, and
- determining, from the correlation, a status parameter of pixels defining the part considered.

142. The apparatus of claim 141, which comprises means for determining a correlation, during the heart cycle, for the pixels of the part considered, between the actual activity and the average activity of the part considered.

143. An apparatus for synchronized electrocardiogram tomographic imaging, said apparatus comprising a computing system for executing the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said computing system comprising at least means for executing the followings:
- reading data obtained from the synchronized electrocardiogram tomographic imaging corresponding to 3dimensional images at different time bins, said images being defined by pixels;
- determining pixels defining at least a part of the peel of the right ventricles, said ventricle having the general shape of a tube with a point of cuvature extending between two valves;
- determining a 3dimensional parameter for the pixels considered;
- using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered.

144. The apparatus of claim 143, in which the transform defines each pixel by parameters characterizing the position of the pixel considered in a plane passing through said pixel and through a base defined between the first and second valves.

145. The apparatus of claim 143, in which the position of each pixel of the peel of tie right ventricle is defined by the parameters i and j, said parameter being determined by the following formulas:

$\theta = \text{arc tangent}((y_{base}-y)/(z-z_{cog}))$ $i = NSA*(\theta-\theta_0)/(\theta^e-\theta_0)$ $r = \text{sqrt}((y_{base}-y)^2+(z-z_{cog})^2)$ $j = (NPSA/2\pi)*\text{arc tangent}((x-x_{cog,i})/(r-r_{cog,i}))$ whereby
- x,y,z are the position of the pixel considered along three perpendicular axis;
- $y_{base}$ is the y position of the base;
- $\theta^0$, $\theta^e$ are the start- and stop angle over which i rotates (for example 18° and 150°);
- $z_{cog}$ is the global center of gravity of the RV;
- $x_{cog,i}$, $r_{cog,i}$ are respectively the x and r positions of the center of gravity of the RV in the i-plane;
- NSA is the number of concentric circles in the bullseye;
- NPSA is the number of sectors in the bullseye.

146. An apparatus for synchronized electrocardiogram tomographic imaging, said apparatus comprising a computing system for executing the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said computing system comprising at least means for executing the followings:
- reading data obtained from the synchronized electrocardiogram tomographic imaging corresponding to 3dimensional images at different time bins, said images being defined by pixels;
- determining pixels defining at least a part of a wall of the right ventricle, said ventricle having the general shape of a tube with a point of cuvature extending between two valves;
- determining for said part an average activity at each time bin,
- determining for said part for at least a part of the heart cycle, an average slope of activity in function of time bins;
- determining for each pixel of the part considered and for the portion of heart cycle considered, an actual slope of activity in function of time bins, and
- determining a status parameter of pixels defining the part considered, by comparison for the pixel considered, the actual slope of activity with the average slope;
- determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

147. The apparatus of claim 146, in which the transform defines each pixel by parameters characterizing the position of the pixel considered in a plane passing through said pixel and through a base defined between the first and second valves.

148. The apparatus of claim 146, in which the position of each pixel of the peel of the right ventricle is defined by the parameters i and j, said parameter being determined by the following formulas:

$$\theta = \text{arc tangent}((y_{base}-y)/(z-z_{cog}))$$
$$i = NSA*(\theta-\theta_0)/(\theta_e-\theta_0)$$
$$r = \text{sqrt}((y_{base}-y)^2+(z-z_{cog})^2)$$
$$j = (NPSA/2\pi)*\text{arc tangent}((x-x_{cog,i})/(r-r_{cog,i}))$$

whereby x,y,z are the position of the pixel considered along three perpendicular axis;

$y_{base}$ is the y position of the base;

$\theta_0$, $\theta_e$ are the start- and stop angle over which i rotates (for example 18° and 150°);

$z_{cog}$ is the global center of gravity of the RV;

$x_{cog,i}$, $r_{cog,i}$ are respectively the x and r positions of the center of gravity of the RV in the i-plane;

NSA is the number of concentric circles in the bullseye;

NPSA is the number of sectors in the bullseye.

149. An apparatus for synchronized electrocardiogram tomographic imaging, said apparatus comprising a computing system for executing the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said computing system comprising at least means for executing the followings:

reading data obtained from the synchronized electrocardiogram tomographic imaging corresponding to 3dimensional images at different time bins, said images being defined by pixels;

determining pixels defining at least a part of a wall of a region of interest of the heart;

determining for said part an average activity at each time bin, determining for said part for at least a part of the heart cycle, an average slope of activity in function of time bins;

determining a correlation, time bin per time bin, for the pixels of the part considered, between the actual activity and the average activity of the part considered, and determining, from the correlation, a status parameter of pixels defining the part considered, by comparison for the pixel considered, the actual slope of activity with the average slope;

determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and representing the status parameter of the pixel in said two dimensional representation.

150. The apparatus of claim 149, in which the transform defines each pixel by parameters characterizing the position of the pixel considered in a plane passing through said pixel and through a base defined between the first and second valves.

151. The apparatus of claim 149, in which the position of each pixel of the peel of the right ventricle is defined by the parameters i and j, said parameter being determined by the following formulas:

$$\theta = \text{arc tangent}((y_{base}-y)/(z-z_{cog}))$$
$$i = NSA*(\theta-\theta_0)/(\theta_e-\theta_0)$$
$$r = \text{sqrt}((y_{base}-y)^2+(z-z_{cog})^2)$$
$$j = (NPSA/2\pi)*\text{arc tangent}((x-x_{cog,i})/(r-r_{cog,i}))$$

whereby x,y,z are the position of the pixel considered along three perpendicular axis;

$y_{base}$ is the y position of the base;

$\theta^0$, $\theta_e$ are the start- and stop angle over which i rotates (for example 18° and 150°);

$z_{cog}$ is the global center of gravity of the RV;

$x_{cog,i}$, $r_{cog,i}$ are respectively the x and r positions of the center of gravity of the RV in the i-plane;

NSA is the number of concentric circles in the bullseye;

NPSA is the number of sectors in the bullseye.

152. The apparatus of claim 149, which comprises means for determining a correlation, during the heart cycle, for the pixels of the part considered, between the actual activity and the average activity of the part considered.

153. An apparatus for synchronized electrocardiogram tomographic imaging, said apparatus comprising a computing system for executing the treatment of data obtained from synchronized electrocardiogram tomographic imaging, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said computing system comprising at least means for executing the followings:

reading data obtained from the synchronized electrocardiogram tomographic imaging corresponding to 3dimensional images at different time bins, said images being defined by pixels;

using a matched filter for determining a parameter of pixels in function of a non spatial dimension.

154. The apparatus of claim 153, which comprises means for:
- determining pixels defining at least a part of a wall of a region of interest of the heart;
- determining for said part, by using a matched filter, an average activity at each time bin,
- determining for said part for at least a part of the heart cycle, by using a matched filter, an average slope of activity in function of time bins;
- determining for each pixel of the part considered and for the portion of heart cycle considered, an actual slope of activity in function of time bins, and
- determining a status parameter of pixels defining the part considered, by comparison for the pixel considered, the actual slope of activity with the average slope.

155. The apparatus of claim 153, which comprises means for:
- determining for said part an average activity at each time bin, by using a matched filter,
- determining, by using a matched filter, for said part for at least a part of the heart cycle, an average slope of activity in function of time bins;
- determining a correlation, time bin per time bin, for the pixels of the part considered, between the actual activity and the average activity of the part considered, and
- determining, from the correlation, a status parameter of pixels defining the part considered.

156. The apparatus of claim 153, which comprises means for:
- determining pixels defining at least a part of a wall of the right ventricle;
- determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and
- representing the status parameter of the pixel in said two dimensional representation.

157. The apparatus of claim 155, which comprises means for:
- determining pixels defining at least a part of a wall of the right ventricle;
- determining a 3dimensional parameter for the pixels considered and using a transform for showing said 3 dimensional parameter in a 2dimensional representation, said transform defining the 3D position of each considered pixel by a first parameter following the tube from a first valve up to the other valve and defining the position of the pixel correlated to a distance between the pixel considered and the first valve following the tube, and a second parameter correlated to the position of the pixel in a plane passing through the pixel considered, and
- representing the status parameter of the pixel in said two dimensional representation.

158. An apparatus for synchronized electrocardiogram tomoscintigraphy, said apparatus comprising a computing system for executing the treatment of data obtained from synchronized electrocardiogram tomoscintigraphy, said data being correlated to image giving the activity of a heart comprising auricles, ventricles, valves and septum, said image comprising at least: (a) a first portion consisting of the pixels showing the auricles and ventricles during the cardiac cycle, each cycle comprising successive time bins with an end-systole time and end-diastole time, and (b) a second portion consisting of pixels substantially not involved with said cardiac activity, said apparatus comprising a processor, an input/output device, and a data storage device, said computing system comprising at least means for executing the followings:
- reading data from the electrocardiogram tomoscintigraphy giving images of the activity pixel at each time bin;
- determining from said images a variation parameter for pixels over a nonspatial dimension;
- determining at least from said variation parameter at least two segments selected from the group consisting of the ventricular segments and the auricular segments;
- determining from said at least two segments, a segment selected from the group consisting of the valvular plane and the septum.

159. The apparatus of claim 158, which comprises means for:
- determining the ventricular segments and the auricular segments, and
- determining the valvular plane between said segments.

160. The apparatus of claim 158, which comprises a means for segmenting pixels in function of the determined parameter variation so as to define various segments, in which the segments are merged upto a limited number of segments, and a means for labeling the segments with a label selected from the group consisting of ventricular, auricular, right and left.

161. The apparatus of claim 159, in which the ventricle segments and the auricle segments are labeled by at least two different methods, and in which the computer process comprises a voting instruction for labeling the segments as being ventricle or auricle.

162. The apparatus of claim 158, which comprises means for:
- determining for pixels corresponding to ventricles and auricles, the maximum activity over time;
- segmenting the pixels in function of their maximum activity, so as to define segments separated by valley,
- merging segments with a low valley therebetween up to obtain less than 8 merged segments;
- determining at least from said merged segments a ventricle segment and an auricle segment, and
- labeling the region between the left and right sides as the valvular plane.

163. The apparatus of claim 160, which comprises means for labeling the left side and right side segments by at least two different methods, and a voting means for labeling the segments as being left or right.

164. The apparatus of claim 160, which comprises means for:
- determining for pixels corresponding to the left and right side segments, the maximum activity over time;
- segmenting the pixels in function of their maximum activity, so as to define segments separated by valley,
- merging segments with a low valley therebetween up to obtain less than 8 merged segments;

determining at least from said merged segments a left side and a right side of the heart, and labeling the region between the left and right sides as the septum.

165. The storage medium of claim 35, in which the computer process further comprises the steps of:

determining for pixels corresponding to ventricles and auricles, the maximum variation of activity over time;

segmenting the pixels in function of their maximum variation of activity, so as to define segments separated by valley, merging segments with a low valley therebetween up to obtain less than 8 merged segments;

determining at least from said merged segments a ventricle segment and an auricle segment, and labeling the region between the left and right sides as the valvular plane.

166. The method of claim 76, in which the computer process further comprises the steps of:

determining for pixels corresponding to ventricles and auricles, the maximum variation of activity over time;

segmenting the pixels in function of their maximum variation of activity, so as to define segments separated by valley, merging segments with a low valley therebetween up to obtain less than 8 merged segments;

determining at least from said merged segments a ventricle segment and an auricle segment, and labeling the region between the left and right sides as the valvular plane.

167. The apparatus of claim 117, which comprises means for:

determining for pixels corresponding to ventricles and auricles, the maximum variation of activity over time;

segmenting the pixels in function of their maximum variation of activity, so as to define segments separated by valley, merging segments with a low valley therebetween up to obtain less than 8 merged segments;

determining at least from said merged segments a ventricle segment and an auricle segment, and labeling the region between the left and right sides as the valvular plane.

168. The apparatus of claim 158, which comprises means for:

determining for pixels corresponding to ventricles and auricles, the maximum variation of activity over time;

segmenting the pixels in function of their maximum variation of activity, so as to define segments separated by valley, merging segments with a low valley therebetween up to obtain less than 8 merged segments;

determining at least from said merged segments a ventricle segment and an auricle segment, and labeling the region between the left and right sides as the valvular plane.

* * * * *